United States Patent [19]
Inoue

[11] Patent Number: 5,901,119
[45] Date of Patent: May 4, 1999

[54] RECORDING APPARATUS, PLAYBACK APPARATUS AND RECORDING MEDIUM HAVING A MANAGEMENT AREA WITH PROGRAM POSITION AND PLAYBACK INFORMATION

[75] Inventor: Hiraku Inoue, Kanagawa, Japan

[73] Assignee: Sony Corporation, Tokyo, Japan

[21] Appl. No.: 08/914,391

[22] Filed: Aug. 18, 1997

[30] Foreign Application Priority Data

Aug. 23, 1996 [JP] Japan .................................. 8-239978

[51] Int. Cl.$^6$ .................................................. G11B 17/22
[52] U.S. Cl. ........................... 369/32; 369/275.3; 369/58
[58] Field of Search .......................... 369/32, 58, 275.3, 369/275.2, 54, 48, 47

[56] References Cited

U.S. PATENT DOCUMENTS

| | | | |
|---|---|---|---|
| 4,495,609 | 1/1985 | Russell | 369/44 |
| 4,530,073 | 7/1985 | Higashihara et al. | 369/50 |
| 4,536,864 | 8/1985 | Van Rosmalen | 369/44 |
| 4,796,123 | 1/1989 | Takeuchi et al. | 360/10.1 |
| 4,796,247 | 1/1989 | Vogelsang | 369/44 |
| 4,837,626 | 6/1989 | Nishiyama et al. | 358/183 |
| 4,982,390 | 1/1991 | Tanaka | 369/30 |
| 4,984,103 | 1/1991 | Nigam | 360/74.1 |
| 5,014,136 | 5/1991 | Sakai et al. | 358/341 |
| 5,032,930 | 7/1991 | Suetaka et al. | 358/342 |
| 5,034,827 | 7/1991 | Fukatsu et al. | 360/10.3 |

(List continued on next page.)

FOREIGN PATENT DOCUMENTS

| | | |
|---|---|---|
| 82643/91 | 2/1992 | Australia . |
| 0138246 A2 | 4/1985 | European Pat. Off. . |
| 0155970 A1 | 10/1985 | European Pat. Off. . |
| 0196590 A3 | 10/1986 | European Pat. Off. . |
| 0249781 A3 | 12/1987 | European Pat. Off. . |
| 0283727 A2 | 9/1988 | European Pat. Off. . |
| 0367094 A2 | 5/1990 | European Pat. Off. . |
| 0406021 A2 | 1/1991 | European Pat. Off. . |
| 040211 A3 | 4/1991 | European Pat. Off. . |
| 0429139 A1 | 5/1991 | European Pat. Off. . |
| 0465053 A3 | 1/1992 | European Pat. Off. . |
| 0485234 A2 | 5/1992 | European Pat. Off. . |
| 0597339 A1 | 5/1994 | European Pat. Off. . |
| 0600511 A2 | 6/1994 | European Pat. Off. . |
| 0697699 A2 | 2/1996 | European Pat. Off. . |
| 2317726 | 7/1975 | France . |
| 1560494 | 2/1980 | United Kingdom . |
| 21361912 | 9/1984 | United Kingdom . |
| 2258372 | 3/1993 | United Kingdom . |

OTHER PUBLICATIONS

Patent Abstracts of Japan, vol. 16, No. 139 (P–1334), Victor Co. of Japan Ltd., JP 3–296927, Dec. 12, 1991, INV: Shigeru Nemoto.

Patent Abstracts of Japan, vol. 17, No. 438 (P–1591), Pioneer Electronic Corp., JP 5–089469, Apr. 9, 1993, INV: Eiji Muramatsu.

Patent Abstracts Of Japan, vol. 13, No. 353, P. 199, JP–1–112573, Published May 1, 1989, INV: Junichi Kondo.

Sony Mini Disc System Technical Manual, Mar. 1992, Sony Corporation Audio Development Group, Tokyo, Japan.

*Primary Examiner*—Tan Dinh
*Attorney, Agent, or Firm*—Limbach & Limbach L.L.P.

[57] ABSTRACT

In the present invention, a user can set the order of playing-back programs recorded in a program region, with interactive playback then being possible by recording the playback order of programs set by the user in a management region.

Preferred playback is possible in the present invention by recording playback conditions such as volume, fade-in, fade-out and equalization etc. for each program to be played back in the management region. Further, in a multi-access mode, program numbers capable of providing quick playback are managed in the management region. Playback is then possible directly after a user has selected a program by storing the beginning parts of program number capable of quick playback managed in the management region directly after installation of the recording medium.

10 Claims, 14 Drawing Sheets

U.S. PATENT DOCUMENTS

| | | | |
|---|---|---|---|
| 5,042,019 | 8/1991 | Kitai et al. | 369/32 |
| 5,070,419 | 12/1991 | Kiyonaga | 360/72.2 |
| 5,140,571 | 8/1992 | Nishida et al. | 369/44.11 |
| 5,212,678 | 5/1993 | Roth et al. | 369/60 |
| 5,214,631 | 5/1993 | Maeda et al. | 369/59 |
| 5,224,087 | 6/1993 | Maeda et al. | 369/54 |
| 5,224,089 | 6/1993 | Matsumura et al. | 369/124 |
| 5,243,587 | 9/1993 | Itoh et al. | 369/48 |
| 5,243,588 | 9/1993 | Maeda et al. | 369/54 |
| 5,291,467 | 3/1994 | Ishiwata et al. | 369/44.28 |
| 5,317,553 | 5/1994 | Ohga et al. | 369/54 |
| 5,418,762 | 5/1995 | Kitayama | 369/13 |
| 5,440,529 | 8/1995 | Takezawa et al. | 369/13 |
| 5,442,608 | 8/1995 | Umeda ET AL. | 369/44.27 |
| 5,687,397 | 11/1997 | Ohmori | 369/32 |
| 5,737,290 | 4/1998 | Ohmori | 369/32 |
| 5,768,252 | 6/1998 | Yokota | 369/275.3 |

FIG. 4

| | | 16bit | | 16bit | | |
|---|---|---|---|---|---|---|
| | | MSB          LSB | MSB          LSB | MSB          LSB | MSB          LSB | |
| HEADER | | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | Cluster H | Cluster L | Sector(00h) | MODE(02h) | 3 |
| CORRESPONDING TABLE DESIGNATION DATA PART | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disk Serial No | 10 |
| | | Disc | ID | P-DFA | P-EMPTY | 11 |
| | | P-FRA | P-TNO1 | P-TNO2 | P-TNO3 | 12 |
| | | P-TNO4 | P-TNO5 | P-TNO6 | P-TNO7 | 13 |
| | | P-TNO248 | P-TNO249 | P-TNO250 | P-TNO251 | 74 |
| | | P-TNO252 | P-TNO253 | P-TNO254 | P-TNO255 | 75 |
| | | 00000000 | 00000000 | 00000000 | 00000000 | 76 |
| | | 00000000 | 00000000 | 00000000 | 00000000 | 77 |
| MANAGEMENT TABLE PART (255 PART TABLE) | (01h) | START ADDRESS | | | TRACK MODE | 78 |
| | | END ADDRESS | | | LINK INFORMATION | 79 |
| | (02h) | START ADDRESS | | | TRACK MODE | 80 |
| | | END ADDRESS | | | LINK INFORMATION | 81 |
| | (03h) | START ADDRESS | | | TRACK MODE | 82 |
| | | END ADDRESS | | | LINK INFORMATION | 83 |
| | (FCh) | START ADDRESS | | | TRACK MODE | 580 |
| | | END ADDRESS | | | LINK INFORMATION | 581 |
| | (FDh) | START ADDRESS | | | TRACK MODE | 582 |
| | | END ADDRESS | | | LINK INFORMATION | 583 |
| | (FEh) | START ADDRESS | | | TRACK MODE | 584 |
| | | END ADDRESS | | | LINK INFORMATION | 585 |
| | (FFh) | START ADDRESS | | | TRACK MODE | 586 |
| | | END ADDRESS | | | LINK INFORMATION | 587 |

EXAMPLE OF DISC CONTENTS
FIG. 10A
| PROGRAM NO. | AUDIO CONTENTS | PROGRAM NO. | AUDIO CONTENTS |
|---|---|---|---|
| #1 | SONG A | #11 | CHEERS |
| #2 | SONG B | #12 | FOREST |
| #3 | SONG C | #13 | CITY |
| #4 | CHIME | #14 | RIVER |
| #5 | SONG D | #15 | BUZZER |
| #6 | SONG E | #16 | SONG H |
| #7 | SONG F | #17 | SONG I |
| #8 | SONG G | #18 | SONG J |
| #9 | LAUGHING | #19 | SONG K |
| #10 | HORN | #20 | SONG L |
PROGRAM LISTING
FIG. 10B
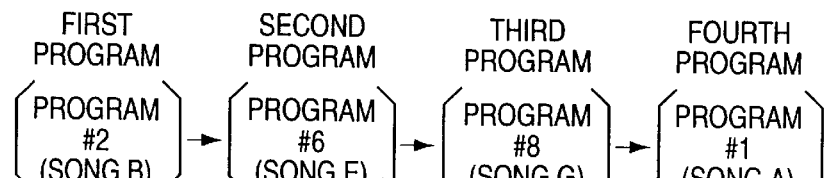
FIRST PROGRAM LISTING TAKEN FROM P-LST-A1
MULTI-ACCESS LISTING
FIG. 10C
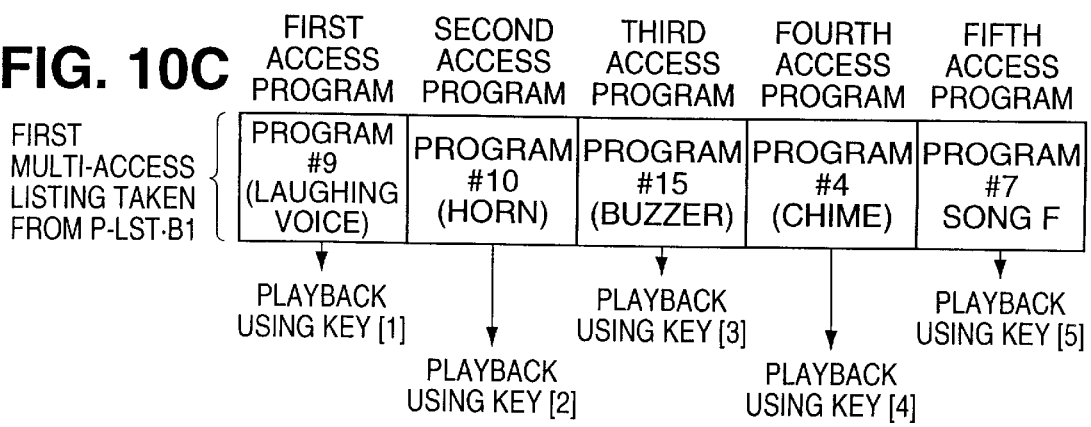

RECORDING APPARATUS, PLAYBACK APPARATUS AND RECORDING MEDIUM HAVING A MANAGEMENT AREA WITH PROGRAM POSITION AND PLAYBACK INFORMATION

BACKGROUND OF THE INVENTION

The present invention relates to a recording medium for recording main data such as, for example, audio data and a playback device capable of carrying out playback operations corresponding to this recording medium.

Various recording media and recording/playback devices have been disclosed but in particular, well known minidisc (trademark) systems where a user freely records audio data etc. have become widespread.

In the case of minidisc systems, for example, a management region known as a User-Table of Contents (hereinafter referred to as a "U-TOC") is recorded, separate from the main data such as audio etc., for managing regions on the disc where the user carries out recording and managing regions where nothing is recorded.

The recording device then confirms regions where recording can be carried out while referring to the U-TOC, i.e. confirms the addresses of free areas and then records audio data at these free areas.

The playback device can then use the U-TOC to comprehend the program address recorded with audio information etc. to be played back and prescribed playback operations can be carried out.

Each of the programs etc. recorded is managed at the U-TOC in program units and the start and end addresses are listed. The start and end addresses etc. are also listed for recordable areas (free areas) that are as yet un-recorded.

Various modes are also prepared as playback modes for the playback device in addition to the order for playing back the programs. Program playback mode, shuffle playback mode and multi-access playback mode etc. are also provided in addition to the continuous playback mode for carrying out usual playback operations in program number order.

Program playback mode is a mode where the user arbitrarily sets program numbers, with playback then being carried out in the order of this set mode.

Shuffle playback mode is a mode where program numbers are selected randomly by a random number generation operation within the playback device and the selected programs are played back.

Multi-access playback mode is a mode also known as "quick start reproducing" where played-back audio is outputted immediately in response to playback operations for specific programs. Here, "immediately" means the timing excluding the time necessary for starting up the optical head and for making accesses that are necessary in usual program playback operations and is a time where the played back audio is outputted at almost the same time as the playback operation.

Regarding this "quick start reproducing", the present applicant filed U.S. patent application Ser. No. 081588543 on Jan. 18th, 1996. The present applicant also made a related application in the past, of U.S. Pat. Ser. No. 4,530,073.

For example, when program number #1 to program number #5 are taken as the target of the multi-access playback mode, a few seconds of audio data at the head of each program is taken into a memory of a D-RAM etc. beforehand. In doing so, when, for example, playback of program number #3 is carried out the leading data of program number #3 taken in by the memory is first read out. The played-back audio can then be outputted at a time when the starting up of playback of the disc is not yet complete. Starting up and accessing for the disc playback operation can then finish while data played back from the memory is being outputted and the played back audio can then be continued to be outputted in an appropriate manner by continuing to read out data. This multi-access playback mode is a playback mode for application in cases such as the playing back of sound effects in, for example, plays and broadcasts etc. where the timing of the outputting of the played-back audio is extremely important as audio is played back immediately in response to user operations.

In this specification, from a first program to an nth program of the programs recorded on the disc are described as "program #1" to "program #n" with the mark "#" appended. There are also then cases where the program number is then described simply as "#2".

In the program playback mode and the multi-access playback mode, the user can previously set program orders or target programs.

For example, in the operation for program playback mode, the user first designates the program playback order. The designated program playback order is then held by a microprocessor computer within the playback device, with a controller then performing playback of the disc in the designated program order in response to user playback operations.

In multi-access playback mode, the user designates target programs. The numbers of designated target programs are then held by the microprocessor controller within the playback device and the controller takes audio data for the leading few seconds of all of the target programs into memory. After this, the leading portion for the corresponding program is played back immediately from the memory in response to playback operations for a prescribed program performed by the user.

A register for saving the program order is built-into the microprocessor computer. However, data for the order of playing back the programs or for the target programs set by the user is lost when other modes are switched over to, the disc is ejected or when the power supply is turned off, etc. after operations have been carried out in these program playback modes or multi-access playback modes. The user therefore has to input the settings for the program order and the target programs all over again even when carrying out the same program or multi-access playback as for the previous time every time the disc is installed. This is extremely troublesome for the user, particularly when the same program playback and multi-access playback is to be carried out over and over again.

In conventionally executed program playback modes and multi-access playback modes there were only functions for setting the program order and target programs. Setting of, for example, more detailed playback operation control preferable at the time of playback was not possible. Because of this, a greater variety of operation control is to be achieved with regards to the playback of each program at the time of playing back special effects in program playback mode or multi-access playback mode.

In order to resolve the above problems, it is an object of the present invention to provide a recording medium having a specific playback mode management region capable of carrying out operation management in each of the various playback modes and a playback device capable of carrying out specific playback mode operations employing this specific playback mode management region.

SUMMARY OF THE INVENTION

As the present invention there is therefore provided a recording device, listing a playback order of programs of a recording medium consisting of a program region recorded with the programs and a management region recorded with first management information for at least managing recording positions of programs recorded at the program region and second management information stipulating playback operations during playback of programs recorded at the program region, having:

an operation part for listing programs desired by a user;

memory for storing an order of programs listed by the operation part; and an updating part for updating the second management information of the management region based on a listed program order stored in the memory.

Further, as the present invention, there is provided a recording/playback device, listing a playback order of programs of a recording medium consisting of a program region recorded with the programs and a management region recorded with first management information for at least managing recording positions of programs recorded at the program region and second management information stipulating playback operations during playback of programs recorded at the program region, having:

a first operation part for listing programs desired by a user;

a first memory for storing an order of programs listed by the first operation part;

an updating part for updating the second management information of the management region based on a listed program order stored in the first memory;

a second memory for referring to the second management information of the management region and successively recording for a prescribed period of time leading portions of listed programs;

a second operation part for carrying out playback designation of listed programs; and an output unit for playing back and outputting leading portions of programs corresponding to operations of the second operation part from the second memory in response to operations of the second operation part.

Further, there is provided as the present invention a recording medium having a program region recorded with programs and a management region recorded with first management information for at least managing recording positions of programs recorded at the program region and second management information stipulating playback operations during playback of programs recorded at the program region.

BRIEF DESCRIPTION OF THE DRAWINGS

FIG. 4 shows the data configuration of a management region U-TOC (User Table Of Contents) sector 0 for a recording medium to which the present invention is applied;

FIG. 10A shows the contents of a program recorded at the recording medium;

FIG. 10B is a transition diagram showing a program order carried out by program listing;

FIG. 10C is a transition diagram showing a program order carried out by multi-access listing;

DETAILED DESCRIPTION OF THE PREFERRED EMBODIMENTS

First Embodiment

The following is a description of an embodiment of the present invention using FIG. 1 to FIG. 15. This example takes a magneto-optical disc (minidisc) capable of recording and playing back audio data as a recording medium and a minidisc recording/playback device is taken as an example of a playback device. This description will be given in the following order.

1. Configuration of the recording/playback device.
2. U-TOC sector-0
3. U-TOC sector-6
4. Management example I for U-TOC sector 6
5. Management example II for U-TOC sector 6
6. Operation of program playback mode
7. Operation of multi-access playback mode 1. Configuration of the recording/playback device.

A description will now be given of the configuration of the minidisc recording/playback device using FIG. 1 to FIG. 3.

Figure 1:
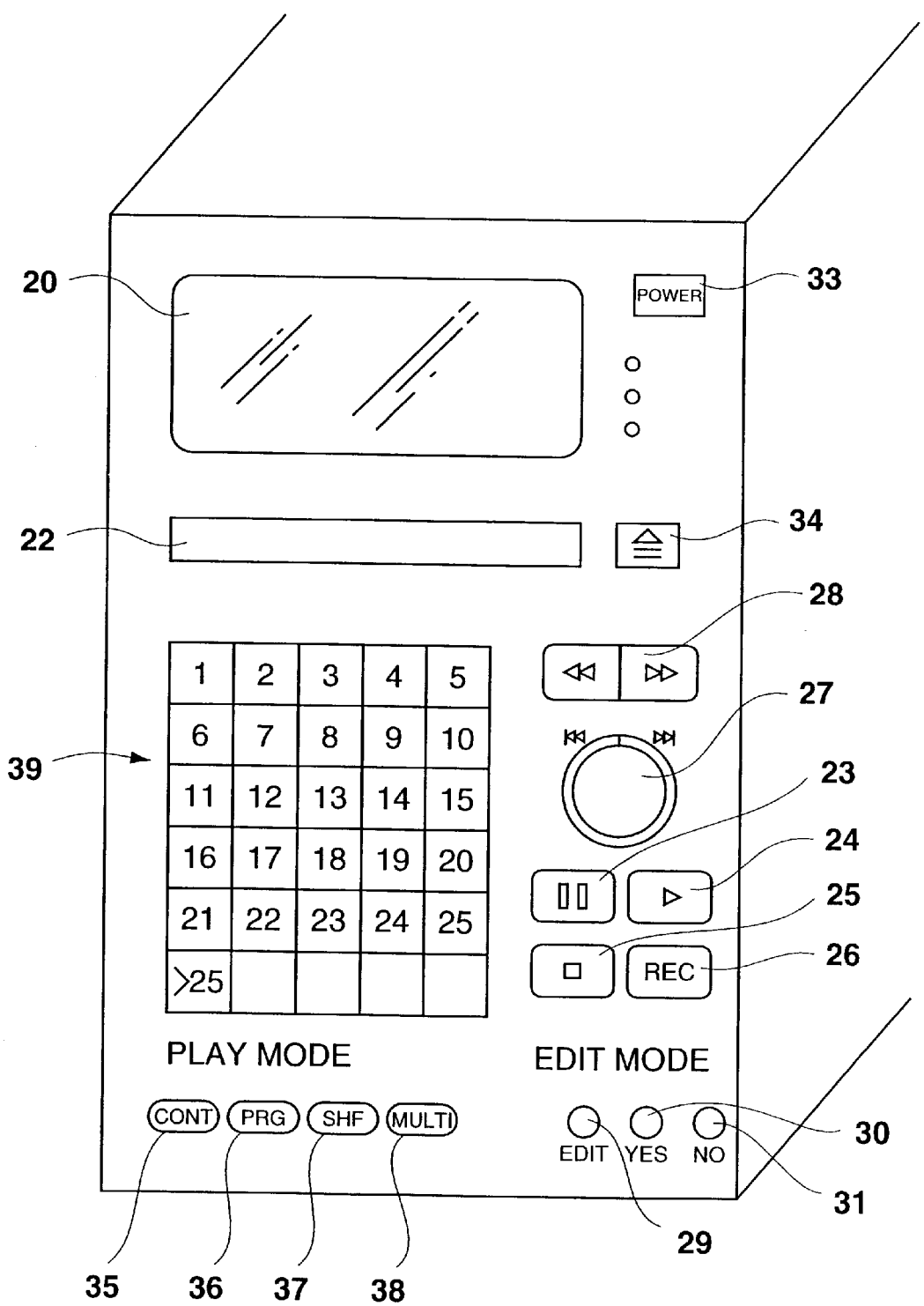
FIG. 1 shows an external view of a recording/playback device to which the present invention is applied.

FIG. 1 shows an example of an external view of the recording/playback device.

A display part 20 employing a liquid crystal display device etc. is formed on a front panel of this recording/playback device. This display part 20 displays the operating conditions of the disc that is being recorded/played back, the program number, the recording time/playback time, editing operation conditions and playback mode etc. Further, with a minidisc system, character information is recorded on the disc but the displaying of input characters while this character information is being inputted or the display of character information read from the disc is also possible.

A power supply key 33 is provided for turning the power supply of the recording/playback device on and off. A disc insertion part 22 into which discs are inserted and from which discs are ejected in response to operation of an eject key 34 is provided on the front panel of the recording/playback device.

Each of the various operating means for carrying out operations relating to recording and playback are provided on this front panel, i.e. a playback key 24, pause key 23, stop key 25, record key 26, Automatic Music Sensor (hereinafter referred to as "AMS") operation dial 27 (hereinafter referred to as a "jog dial") for carrying out jogging access operations, and a search key 28, for carrying out high-speed playback operations. These are so-called basic operation keys relating to the audio recording/playback operations. The jog dial 27 is an operating part for designating AMS (Access Message Search) using this rotational operation. However, in character input mode (or disc name input mode or program name input mode) which is one of the editing modes, the rotational operation of the jog dial 27 provides increments or decrements to aid character selection.

In a program setting mode or a multi-access setting mode that are both edit modes to be described later, the rotational operation of the jog dial 27 provides increments and decrements during program number selection. Further, in a program playback mode or multi-access setting mode to be described later, the rotation operation is used for incrementing and decrementing during list selection.

The jog dial 27 can also be push operated, with this push operation functioning as the enter operation in disc name input mode, program name input mode, program setting mode and multi-access mode etc. The push operation of the jog dial 26 can also combine the playback operation in the same way as the operation for the playback key 24.

Numeric keys 39 are also provided in addition to these operation means.

For example, key [1] to key [25], and a key [>25] for inputting numerals of 26 or more are provided as these numeric keys 39.

The numeric keys 39 can be used for directly selecting the number of the program to be played back, inputting the program number in program setting mode or multi-access setting mode or selecting lists in program playback mode or multi-access playback mode. Further, the numeric keys can become playback keys for each program by allotting each of the programs that are the playback target in multi-access playback mode to each of the numeric keys, with this being described later.

An edit key 29, yes key 30 and cancel key 31 are provided as the keys for the edit mode operations.

The edit key 29 is used for the operations of summoning and ending each of the various edit modes and the yes key 30 and cancel key 31 are used for operations during editing.

A program name input mode for inputting characters such as program titles for each program, a disc name input mode for inputting characters such as names for disc, a name erase mode for erasing recorded character information, a divide mode for dividing one program into a plurality of programs, a combine mode for combining a plurality of programs into one program, an erase mode for erasing programs, a program setting mode for listing programs to be played back and a multi-access setting mode for providing multi-access playback listings are provided as the edit modes.

A continuous playback key 35, program key 36, shuffle key 37 and multi-access key 38 are provided as keys for the playback mode operations.

One of continuous playback mode, program playback mode, shuffle playback mode or multi-access playback mode can then be set as the playback mode by operating these keys.

In this example, these operating means are described as being on the front panel of the recording/playback device but these operation keys can also be provided on a remote control unit, with, for example, the recording/playback device then being operated using this remote control unit via infra-red rays, etc.

The internal configuration of the minidisc recording/playback device of FIG. 1 will now be described using FIG. 2.

A magneto-optical disc 1 recorded with audio data is rotatably driven by a spindle motor 2. An optical head 3 then illuminates the magneto-optical disc 1 with laser light during recording and playback.

The optical head 3 provides a high-level laser output in order to heat a recording program to a Currie temperature during recording and provides a comparatively low level laser output to detect data from light reflected back due to the magnetic Kerr effect during playback.

To achieve this, the optical head 3 is provided with an optical system comprising a laser diode taken as the laser output means, and a polarizing beam splitter and object lens, etc., together with a detector for detecting reflected light. The object lens 3a can be moved in the radial direction and towards and away from the disc and is kept in position by a twin-axial mechanism 4.

Further, a magnetic head 6a is provided at a position opposite the optical head 3 in such a manner as to sandwich the disc 1. The magnetic head 6a applies a magnetic field modulated by supplied data to the magneto-optical disc 1.

The whole of the optical head 3 and the magnetic head 6a can be moved in the radial direction of the disc by a thread mechanism 5.

Information detected from the disc 1 by the optical head 3 is supplied to an RF amplifier 7 as a result of the playback operation. The RF amplifier 7 then extracts an RF playback signal, programing error signal TE, focus error signal FE and group information (absolute position information recorded on the magneto-optical disc 1 as pregrooves (wobbling grooves)) GFM etc. by arithmetically processing the supplied information.

The extracted RF playback signal is supplied to an encoder/decoder 8. The programing error signal TE and focus error signal FE are supplied to a servo circuit 9 and the group information GFM is supplied to an address decoder 10.

The servo circuit 9 generates each of the various servo driving signals using the programing error signal TE, focus error signal FE, program jump and access instructions from a system controller 11 comprising a microcomputer and rotational velocity information for the spindle motor 2, controls the twin-axial mechanism 4 and thread mechanism 5 and carries out focus and programming control, as well as controlling the spindle motor 2 to be at a Constant Linear Velocity (CLV).

The address decoder 10 decodes the supplied group information GFM and extracts address information. This address information is supplied to the system controller 11 and used in each of the various control operations.

The RF playback signal undergoes decode processing such as EFM (Eight-Fourteen demodulation coding) demodulation and CIRC (Cross-Interleaved Reed-Solomon coding) etc. at the encoder/decoder 8 and at this time the address and subcode data etc. is also extracted and supplied to the system controller 11.

Audio data that has been EFM demodulated and CIRC processed etc. at the encoder/decoder 8 is written to a temporary buffer memory 13 by the memory controller 12.

Reading of data from the disc 1 by the optical head 3 and transmission of playback data from the optical head 3 to the buffer memory 13 is at 1.4 Mbits/sec but is carried out intermittently.

Data written to the buffer memory 13 is read out at such a timing that the transmission of the playback data is at 0.3 Mbits/sec and supplied to an encoder/decoder 14. This signal then undergoes playback signal processing such as decode processing etc. for the audio compression processing and is put into the form of a 16-bit quantized digital audio signal sampled at 44.1 KHz.

The digital audio signal is then put into the form of an analog signal by a Digital to Analog (hereinafter referred to as "D/A") converter 15 after sound field adjustment processing such as equalization, reverberation and gain etc. has been carried out at a digital signal processor 21, supplied to prescribed amplifier circuitry from an output terminal 16, played back and outputted as, for example, left and right audio signals.

The digital signal processing circuit is formed from a so-called DSP (Digital Signal Processor) and can carry out various kinds of processing. This is not just equalization processing at the audio settings for each of the various modes but can also be, for example, processing such as fade-in or fade-out processing where the gain (output volume level) is gradually changed.

These kinds of processing parts can also be provided after the D/A converter 15 and be carried out as analog processing.

A recording signal (analog audio signal) supplied to the input terminal 17 is put into the form of digital data by an A/D converter 18 while a recording operation is being executed for the magneto-optical disc 1. This data is then supplied to the encoder/decoder 14 and undergoes audio compression encoding.

Recording data compressed by the encoder/decoder 14 is written to the temporary buffer memory 13 by the memory controller 12 and then read out at a prescribed timing and sent to the encoder/decoder 8. This data is then sent to a magnetic head driving circuit 6 after undergoing encoding such as CIRC encoding and EFM modulation etc. at the encoder/decoder 8.

The magnetic head driving circuit 6 supplies a magnetic head drive signal to the magnetic head 6a in response to the encode-processed recording data, i.e. an N or S magnetic field is applied to the magneto-optical disc 1 by the magnetic head 6a. A control signal is supplied to the optical head at this time by the system controller 11 so that recording level laser light is outputted.

Figure 2:
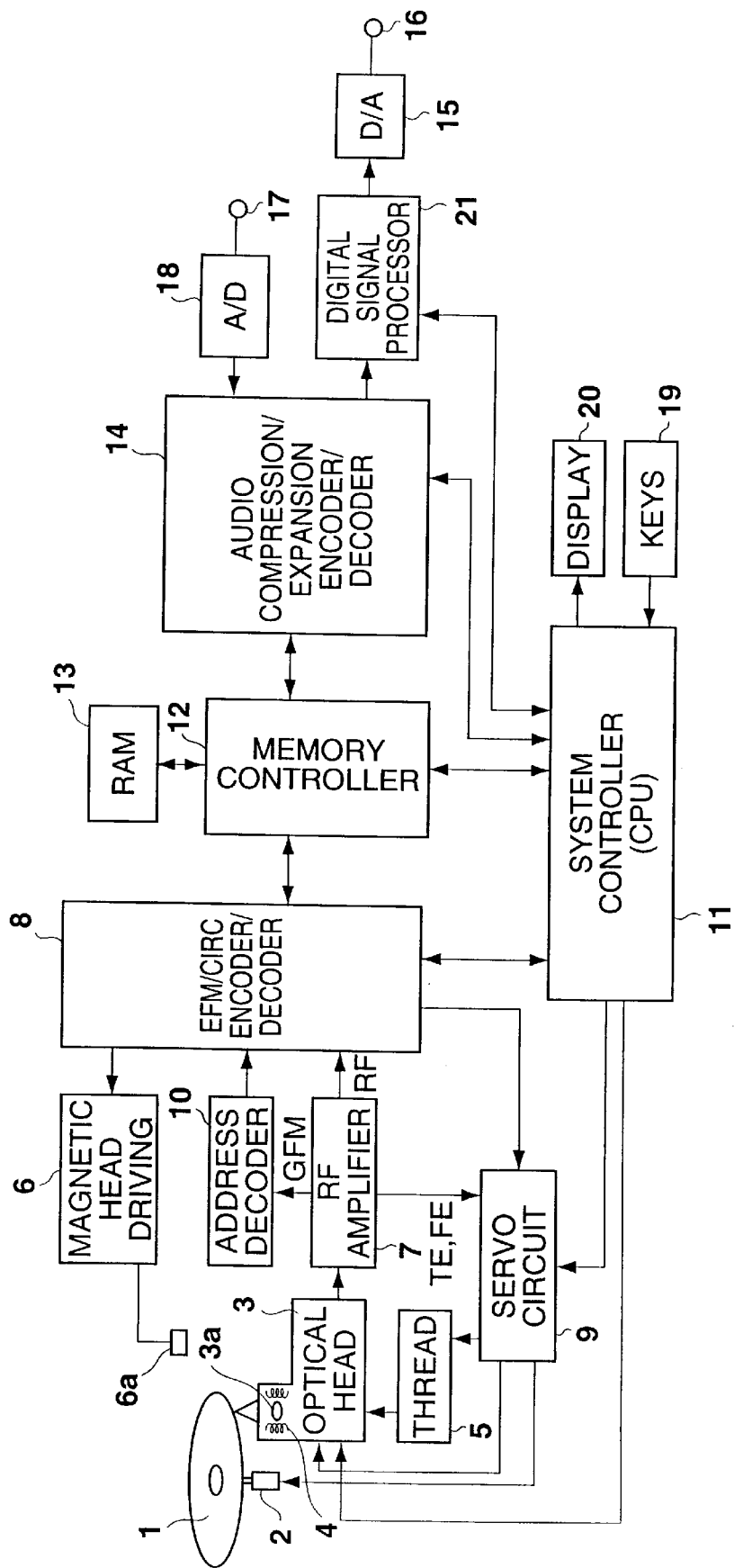
FIG. 2 shows a block diagram of a recording/playback device to which the present invention is applied.

FIG. 2 shows the parts supplied for user operations corresponding to each of the various operation keys and dials described in FIG. 1. Operation information from these operation keys and dials is supplied to the system controller 11, which then executes operation control in response to this operation information.

The display part 20 is provided on a case shape as shown in FIG. 1 with the display operation being controlled by the system controller 11.

Here, it is necessary to read management information recorded on the disc 1, i.e. a Pre-Mastered Table of Contents Area and a User Table of Contents Area while the recording/playback operation is being carried out. The system controller 11 can then identify between area addresses to be recorded on the disc 1 and area addresses to be played back, in accordance with this management information.

Read-out management information is held in the temporary buffer memory 13.

The system controller 11 then reads by executing a playback operation for the innermost periphery of the disc recorded with the management information while the disc 1 is being installed. This information is then stored in the buffer memory 13 and referred to during recording/playback operation of the disc 1.

The U-TOC can be edited and re-written in response to the recording and erasing of data. However, the system controller 11 carries out these editing processes for recording and editing operations with respect to the U-TOC information stored in the buffer memory 13 and the U-TOC area of the disc 1 can be re-written at a prescribed timing in response to this re-writing operation.

Figure 3A:
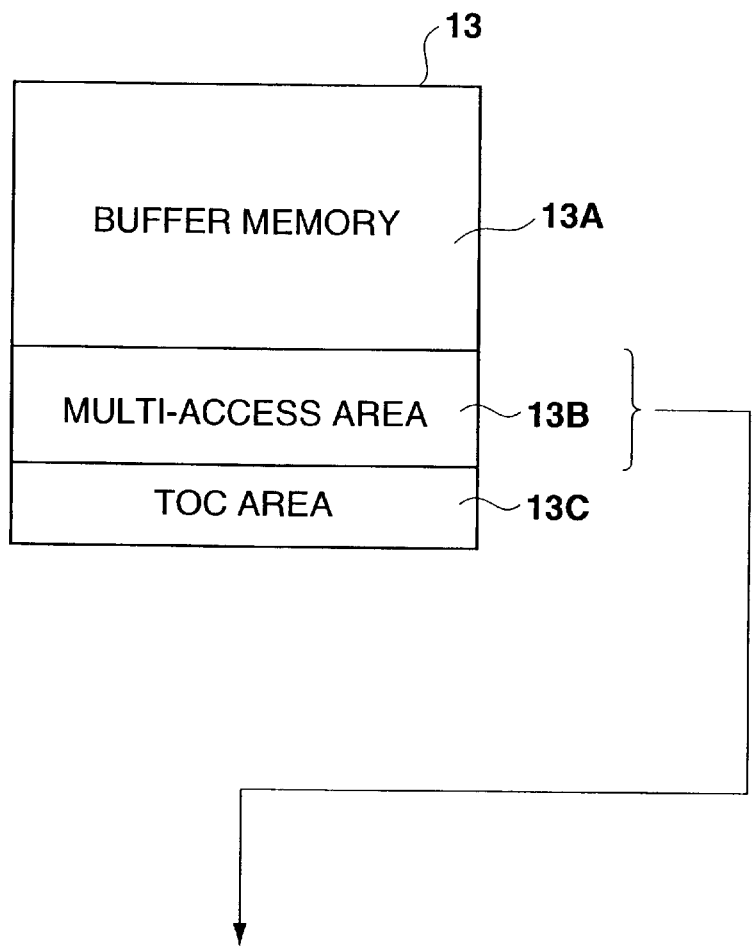
FIG. 3A is a view showing a data area within the memory 13 of FIG. 2.

Regions of the buffer memory 13 are set as shown, for example, in FIG. 3A, with the aforementioned recording data/playback data being temporarily stored in the buffer area 13A.

Further, a TOC area 13C is prepared for storing P-TOC and U-TOC data read from the disc.

Moreover, as is described later, in multi-access playback mode it is necessary to store a few seconds (in this example, eight seconds) of audio data for the head of prescribed programs in the memory 13, with the multi-access area 13B being prepared for this purpose.

Figure 3B:
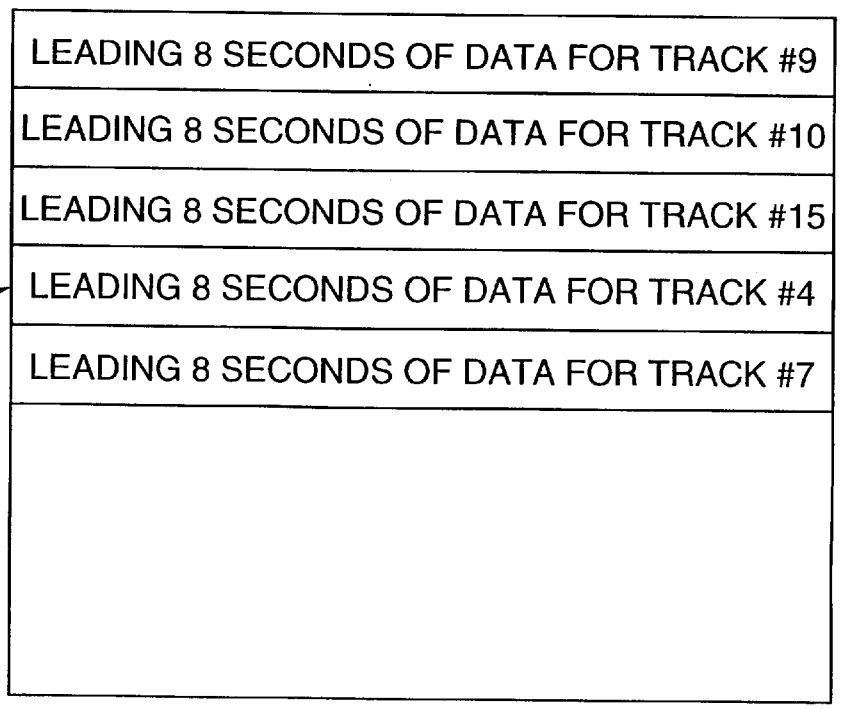
FIG. 3B is a view showing an example of data stored in a multi-access area within the memory 13 of FIG. 2.

Although this is described in detail later, in multi-access playback mode eight-second portions of audio data read from the head of the disc 1 are stored for programs #9, #10, #15, #4 and #7 at the multi-access area 13B, as shown in FIG. 3B, when programs #9, #10, #15, #4 and #7 are taken as the playback programs.

2. U-TOC sector 0

Here, a description will be given of the U-TOC sector for managing recording and playback operations for the audio data of the disc 1.

U-TOCs and P-TOCs are provided here as the TOC information of the disc 1 and as the P-TOC is formed on the pit area at the inner periphery of the disc 1, this P-TOC is read-only information. The management of the position etc. of the recordable areas (recordable user areas), read-out areas and U-TOC areas of the disc can then be carried out using the P-TOC.

A detailed description of the P-TOC will be omitted.

With the U-TOC, one management information unit is formed using one sector, with sector 0, sector 1, sector 2 and sector 4 being defined as U-TOC sectors. The sector 0 is an area that is essential for recording/playback operations of the disc 1. Sector 1 and sector 4 are areas for recording character information and sector 2 is an area for recording the recording time.

In addition to these areas, in this example sector 6 is used as a new management information unit.

A description of sector 1 and sector 4 for recording character information and sector 2 for recording time will be omitted. Here, a description will be given regarding the U-TOC sector 0 necessary for the recording/playback operation of the disc 1.

FIG. 4 shows the format of the U-TOC sector.

The U-TOC sector 0 is a data region recorded with management information for programs mainly used for user recordings or free areas that can be recorded with new programs.

For example, while a certain program is being recorded on the disc 1, the system controller 11 searches the U-TOC sector 0 for free areas on the disc and records audio data at these areas. Further, during playback, areas recorded with programs to be played back are determined from the U-TOC sector 0, these areas are accessed and a playback operation is carried out.

The leading position of data regions (2352 bytes of four bytes×588) for the U-TOC sector 0 is recorded with a synchronization pattern that is one byte of data lined-up as all zeros or all ones.

This is followed by an address comprising a cluster address (Cluster H) (Cluster L) and a sector address (Sector), four bytes of mode information (MODE) is added, and the header is provided thereafter.

A sector is a 2352 byte data unit, with 36 sectors comprising one cluster. The synchronization pattern and addresses are by no means limited to this U-TOC sector 0, with it also being possible to record these units at a P-TOC sector or data sector recorded with actual audio data.

The cluster address is two bytes of an upper address (Cluster H) and a lower address (Cluster L), and the sector address is one byte.

The subsequent data of the maker code, model code, first program number (First TN0), last program number (Last TN0), used sectors (Used sectors), disc serial number and disc ID etc. is then recorded at prescribed byte positions.

Regions of programs designated by the user for recording and free area regions etc. are identified by being made to correspond to a management table to be described later. Regions recorded with various table pointers (P-DFA, P-EMPTY, P-FRA, P-TN01 to P-TN0255) are therefore prepared as corresponding table designation parts.

Here, 255 parts tables are provided from (01h) to (FFh) as management table parts corresponding to the table pointers (P-DFA to P-TN0255). A respective parts table is then recorded with the start address from which a certain part starts, an end address that is the end point, and parts mode information (program mode). Further, as there are cases where parts shown in each of the parts tables are linked to other parts, link information showing a parts table recorded with the start address and end address of the linked parts is also recorded.

In this specification, numerical values appended with [h] are shown to be in hexadecimal. Further, "parts" refers to program portions where data continuous with respect to time is recorded in a physically continuous manner within one program.

With this kind of recording/playback device, even if data of a program are recorded discontinuously over a plurality of the parts, so that the playback operation of the program is carried out without causing any problem. Thus, a user sometimes records a program or the like on a plurality of parts with the program being divided for the purpose of efficiently using the recordable area.

Link information for linking between the aforementioned parts is provided at the U-TOC for this purpose, with, for example, parts tables being linked by, for example, designating parts tables to be linked using numbers (01h) to (FFh) given to each parts table.

At a management table occurring at the U-TOC sector 0, one parts table expresses one part and management of the position of a program comprising, for example, three parts linked together is carried out using three parts tables linked by link information.

In reality, link information is expressed by numerical values taken as byte positions within U-TOC sectors obtained from prescribed arithmetic processing, i.e. designated by a parts table taken as 304+(link information)×8 (byte number).

Each of the parts tables from (01h) to (FFh) occurring in the management table for the U-TOC sector 0 express the contents of the parts as follows using the table pointers (P-DFA, P-EMPTY, P-FRA, P-TN01 to P-TN0255) occurring in the corresponding table designation parts.

The table pointer P-DFA (Pointer for Defective Area) shows the defective regions on the magneto-optical disc 1 and designates the leading parts table within one or a plurality of parts tables indicating parts comprising defective regions that have occurred due to flaws etc. Namely, when a defective part exists, one of (01h) to (FFh) is designated at the table pointer P-DFA, with the start and end addresses of the defective part then being shown at the corresponding parts table. When another defective part exists, this is designated by the above table pointer P-DFA. Another parts table is designated as link information occurring in this parts table with the defective part also being indicated in this other parts table. When there are no further defective parts, the link information is taken to be, for example, [(00h)] and there are taken to be no links thereafter.

The table pointer P-EMPTY (Pointer for Empty Slot) designates the leading parts table of one or a plurality of un-used parts tables occurring in the management table part. When un-used parts tables exist, one of (01h) to (FFh) is designated as the table pointer P-EMPTY. When a plurality of un-used parts tables exist, parts tables are designated sequentially using link information from the parts tables designated by the table pointer P-EMPTY with all of the un-used parts tables being linked on the management table part.

The table pointer P-FRA (Pointer for Free Area) indicates recordable regions comprising free areas that can be written with data on the magneto-optical disc 1 and designates the leading parts table within one or a plurality of parts tables indicating free area parts. Namely, when a free area exists, one of (01h) to (FFh) is designated at the table pointer P-FRA, with the start and end addresses of the free area parts being indicated at the corresponding parts table. When there is a plurality of these parts, sequential designation is carried out until the parts table for which the link information is [(00h)] is reached using the link information.

Figure 5:
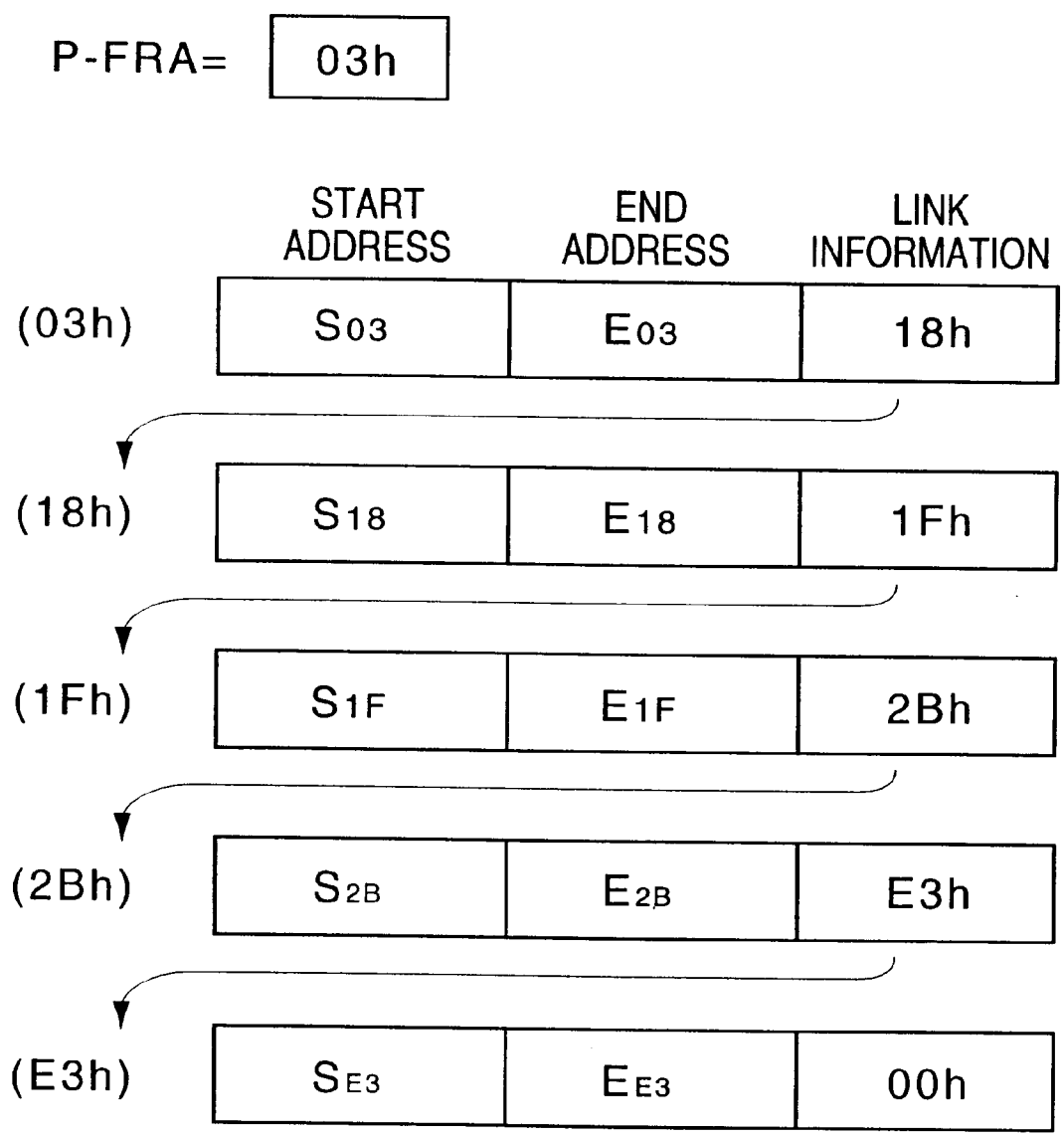
FIG. 5 shows a schematic view illustrating linking conditions to which the present invention is applied.

FIG. 5 schematically shows the management conditions for parts comprising the free area using the parts tables. When the parts (03h) (18h) (1Fh) (2Bh) (E3h) are taken as free areas, these conditions are shown as the conditions expressed by the links for the parts tables (03h) (18h) (1Fh) (2Bh) (E3h) continuing on from the corresponding table designation data P-FRA. The same is also the case for the management conditions for defective regions and unused parts tables.

If the magneto-optical disc is not recorded with any programs at all and has no defects, parts table (01h) is designated by the table pointer P-FRA so that all of the recordable user area of the disc is shown to be a free area. Further, parts tables (02h) to (FFh) are not used, the parts table (02h) is designated by the table pointer P-EMPTY and parts table (03h) is designated as the link information for the parts table (02h) . . . so as to link as far as the parts table (FFh). The link information for the parts table (FFh) is thereafter taken to be [(00h)] indicating no link.

At this time, the start address of the recordable user area is recorded as the start address at the parts table (01h) and the address directly before the lead-out start address is recorded as the end address.

The table pointers P-TN01 to P-TN0255 indicate programs that the user has recorded on the magneto-optical disc 1 with, for example, the parts table showing the part that is the leading part with respect to time of one or a plurality of parts recorded with the data for program #1 being designated at P-TN01.

For example, when the program taken as the program #1 is not divided on the disc across a plurality of parts, i.e. when the program is recorded as one part, the recording region for this program #1 is recorded as start and end addresses occurring in the parts table shown by the table pointer P-TN01. In this case, "00h" is recorded as link information.

When, for example, the program taken as program #2 is recorded on the disc as a plurality of discrete parts, each of the parts are designated in time order in order to indicate the recording position of the program #2. Namely, other parts tables are designated in time order from the parts table designated at the table pointer P-TN02 using the link information so as to link as far as the parts table of link information of [00h] (the above is the same situation as for FIG. 5).

Therefore, by, for example, sequentially designating and recording all of the parts recorded with the data comprising the program #2, the optical head 3 and magnetic head driving circuit 6 can be accessed, audio information comprising discrete linked parts can be captured and recording can be carried out so as to use the recording area in an efficient manner while playback of the program #2 or over-writing to the region on which program #2 is recorded is being carried out using the data for the U-TOC sector 0.

Prescribed conditions are shown using each bit of one byte taken as the program mode information provided at each parts table.

For example, whether the copyright protect is on or off is shown by whether, for example, d2 of 8 bits d1 to d8 taken as the program mode data is [0] or [1]. A bit d4 of [1] will then identify a part as being audio data. Further, d7 will discern mono or stereo and d8 is used for emphasis information.

3. U-TOC Sector 6

In this example, management information relating to a specific playback mode can be recorded using an area as the U-TOC sector 6 that is one unit within the U-TOC. There is no limitation in determining the specific playback modes, but in this example the program playback mode and the multi-access playback mode are taken as the specific mode, with management information relating there to being recorded at the U-TOC sector 6. The U-TOC sector 6 has been used in this example but setting for the regions of formats described in the following can also use other U-TOC sectors such as the sector 7.

Figure 6:
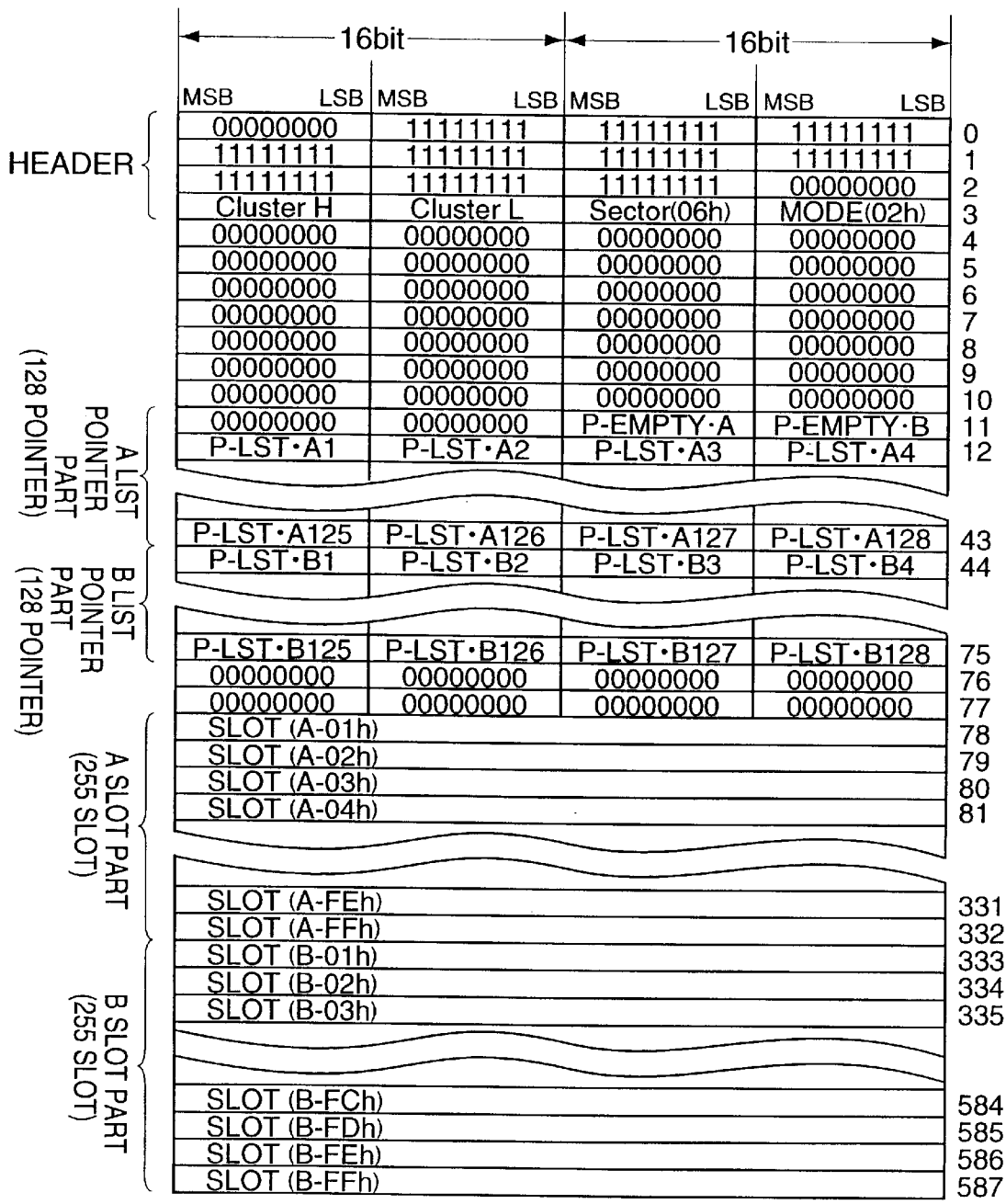
FIG. 6 shows the data configuration of a management region U-TOC sector 6 for a recording medium to which the present invention is applied.

FIG. 6 shows the format of the U-TOC sector 6. A synchronization pattern, cluster address, sector address and mode address are recorded at the leading header in the same way as for other sectors.

One management region ("A management region" in the following) of an A list pointer part and an A slot pointer part and one management region ("B management region" in the following) of a B list pointer and a B slot pointer are formed at this U-TOC sector 6.

In this example, management information relating to the program playback mode is recorded at the A management region of the A list pointer part and the A slot part and management information relating to the multi-access playback mode is recorded at the management region of the B list pointer part and the B slot part.

Further, 128 list pointers P-LST·A1 to P-LST·A128 are provided at the A list pointer part of the A management region.

Moreover, 255 unit slots (A-01h) to (A-FFh) each of four bytes are provided at the A slot part.

Figure 7:
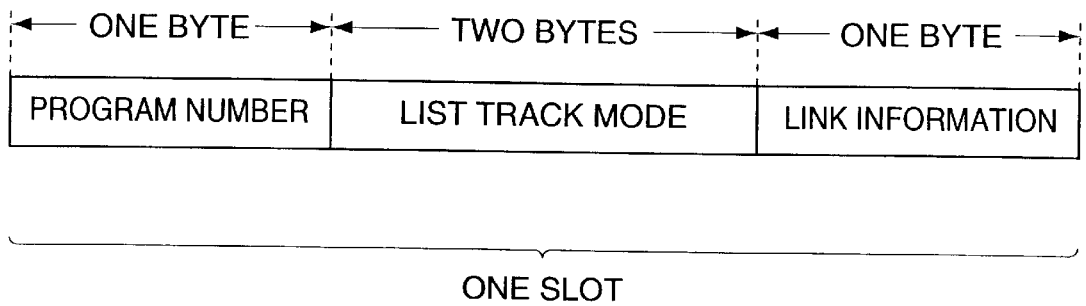
FIG. 7 shows the data configuration of one slot of the management region U-TOC sector 6 for a recording medium to which the present invention is applied.

Each of the slots (A-01h) to (A-FFh) are configured as shown in FIG. 7, i.e. the program number is recorded using one byte and the various items of information ("list program mode" hereafter) relating to the playback operations of this program occurring during program playback are recorded using two bytes.

Further, one byte is taken as link information.

The management of the program playback mode is carried out at the A management region in the following way. The user designates the desired program order for the playback program. However, a program list (user-set program order) of one unit formed by this operation is recorded as one list.

A maximum of 128 program lists can be listed in the A management region by preparing the list pointers P-LST·A1 to P-LST·A128.

A certain slot (A-xxh) is then designated at a certain list pointer P-LST·A(x) listed at the program list, with the first program number for the program list and the list program mode being listed at this slot (A-xxh). Further, another slot is then linked by the link information, with this linked slot being managed by one program list describing the program number of the following program and the list program mode.

Slots of the slots (A-01h) to (A-FFh) that are not being used are managed by linking from a slot pointer P-EMPTY·A.

Further, 128 list pointers P-LST·B1 to P-LST·B128 are provided at the B list pointer part of the B management region.

Moreover, 255 unit slots (B-01h) to (B-FFh) each of four bytes are provided at the A slot part.

Each of the slots (B-01h) to (B-FFh) are configured as shown in FIG. 7 in the same way as for the A slot parts.

The management of the multi-access playback mode is carried out at the B management region in the following way. The user designates the target program to be the subject of multi-access playback. However, a multi-access list (group of target programs set by the user) of one unit formed by this operation is recorded as one list.

A maximum of 128 multi-access lists can be listed in the B management region by preparing the list pointers P-LST·B1 to P-LST·B128.

In the same way as for the A management region, a certain slot (B-xxh) is then designated at a certain list pointer P-LST·B(x) listed at the multi-access list, with the first program number for the program list and the list program mode being listed at this slot (B-xxh). Further, another slot is then linked by the link information, with this linked slot being managed by one multi-access list describing the program number of the following program and the list program mode.

Slots of the slots (B-01h) to (B-FFh) that are not being used are managed by linking from a slot pointer P-EMPTY·B.

Various operation conditions can then be set as the two-byte list program modes occurring at each of the slots (A-01h) to (A-FFh), (B-01h) to (B-FFh) using two bytes (16 bits). For example, settings can be carried out for designating the gain (volume level), fade-in, fade-out and mute etc. at the time of playback and designating the equalization of the outputted audio, tone (base boost, etc.) and reverberation etc. It is also possible to designate classification of information for displaying occurring at the time of playback, designate fonts when displaying character information and designate the distinction between alphabetic characters and kana. The recording of information for just playing back the leading part of a program can also be considered.

It is therefore possible to more finely set the playback conditions for each program using this list program mode while operations are executed based on certain set program lists or multi-access lists.

In this example, management relating to program playback is carried out at the A management region and management relating to multi-access playback is carried out at the B management region. However, various ways can be considered for using the A management region and the B management region for management relating to playback modes, i.e. these regions can be used in management relating to Em playback modes other than program playback and multi-access playback. Further, the A management region and the B management region do not have to be divided between use in management of different playback modes and can, for example, be used to record management information relating to program playback in both the A and the B management regions so as to record a maximum of 256 program lists.

Further, in this example, one U-TOC sector is divided into two management regions of the A management region and the B management region but can also be divided into further numbers of management regions such as, for example, an A region, B region and C region.

4. Management Example I for U-TOC Sector 6

The management relating to program playback carried out at the A management region occurring at the U-TOC sector 6 and the management relating to the multi-access playback carried out at the B management region will now be described using FIG. 8 to FIGS. 10A, 10B and 10C.

FIG. 10A shows an example of the contents recorded on a certain disc. For example, twenty programs #1 to #20 of this disc are recorded, with each of the various resulting sounds such as audio programs A to L, a chime sound and a laughing voice, etc. being recorded with prescribed program numbers.

With regards to this disc, the program order for playing back of the kind shown, for example, in FIG. 10B is designated when the user carries out the program setting mode operation that is one of the edit modes.

Here, program #2 is designated as the first program during program playback, with program #6 being designated as the following second program.

Further, programs #8 and #1 are designated as the third program and fourth program, respectively, i.e. the user sets the program to playback in the order of song B, E, G and A.

The program order designated by this program setting is listed as one program list at the A management region of the U-TOC sector 6. When this program list is taken to be the first program list managed from the list pointer P-LST·A1, this management is carried out, for example, under the conditions shown in FIG. 8.

Namely, a certain slot (for example, slot (A-01h)) is designated at the list pointer P-LST·A(1) and the program number of the first program that is the first program of this program list and the list program mode are listed at this slot (A-01h), i.e. playback starts based on this program number [#2] and a program list and information relating to playback operation control is recorded as the list program mode while program #2 is being played back. The contents to be recorded in list program mode can also be inputted by the user during program listing mode.

When, for example, slot (A-02h) is indicated by the value of the byte position etc. within the sector at the link information for the slot (A-01h), there is linking from slot (A-01h) to slot (A-02h). The program number [#6] for the second program and the list program mode for the operation at the time of playback of the program #6 are then listed at this slot (A-02h).

From the slot (A-02h) onwards slot (A-05h) to (A-09h) are linked, with program number [#8] for the third program and the list program mode for the operations at the time of playback of this program #8 being recorded at slot (A-05h) and program number [#4] for the fourth program and the list program mode for the operations at the time of playback of this program #1 being recorded at slot (A-09h).

In this case, when the user only programs four programs, link information =[00h] is taken for the slot (A-09h) for carrying out recording of the fourth program with it then being shown that there are no slots thereafter because there are no programs from the fifth onwards.

One program list is therefore managed under these conditions.

Next, the user carries out the multi-access setting mode that is one of the edit modes with regards to the disc shown in FIG. 10A so that the programs shown, for example, in FIG. 10C are designated as the playback targets.

Here, five programs of program #9 (laughing voice), program #10 (horn), program #15 (buzzer), program #4 (chime) and program #7 (song F) are designated for multi-access playback.

Tracks #9, #10, #15, #4 and #7 are then allotted the first to fifth access programs as numbers for carrying out operations occurring in multi-access playback mode.

The first access program is a program which is played back using the key [1] occurring in the numeric keys 39 shown in FIG. 1, the second access program is a program that is played back using the key [2], and so on.

After multi-access setting has been carried out, the user sets the playback mode to multi-access playback mode and a program corresponding to the operating key can be immediately played back by operating any of keys [1] to [5] at an arbitrary timing. For example, when there is a time where it is wished to output a chime as sound effects in a play or broadcast, the chime will be outputted instantaneously if the key [4] is pressed at a timing that is the users discretion.

Tracks designated by multi-access settings in this way are listed as one multi-access list in the B management region of the U-TOC sector 6. When the kind of multi-access list of FIG. 10C is taken as the first multi-access list managed from the list pointer P-LST·B1, this management is carried out under the conditions shown in FIG. 9.

Namely, a certain slot (for example, slot (B-01h)) is designated at the list pointer P-LST·B(1), with the program number of the first program of this multi-access list and the list program mode being listed at this slot (B-01h). Namely, multi-access playback mode is adopted based on program number [#9] and the multi-access list, with information relating to the playback operation control occurring during playback of program #9 being recorded in list program mode. In this case also, the contents to be recorded in list program mode can be that inputted by the user at the time of multi-access setting.

When, for example, slot (B-02h) is indicated by the value of the byte position etc. within the sector at the link information for the slot (B-01h), there is linking from slot (B-01h) to slot (B-02h). The program number [#10] for the second program and the list program mode for the operation at the time of playback of the program #10 are then listed at this slot (B-02h).

From the slot (B-02h) onwards, for example, slot (B-03h)-(B-07h)-(B-0Ah) are linked, with the program number [#15] for the third access program and the list program mode for operations at the time of playback of the program #15 being recorded at the slot (B-03h), the program number [#4] for the fourth access program and the list program mode for operation at the time of playback of this fourth program #4 being recorded at slot (B-07h), and the program number [#7] for the fifth access program and the list program mode for operation at the time of playback of the program #7 being recorded at the slot (B-0Ah).

In this case, when the user takes five programs as the target for multi-access playback, there is no sixth program onwards. The link information at slot (B-0Ah) for carrying out recording of the fifth program is therefore taken to be =[00h] indicating that there are no linked slots thereafter.

One multi-access list is then managed under these conditions.

5. Management Example II for U-TOC Sector 6

The A management region and the B management region occurring at the U-TOC sector 6 are basically recorded with management information relating to program playback and multi-access playback as described above. However, a plurality of program lists and multi-access lists can be recorded at each management region. Program playback or multi-access playback is then possible based on this program list or multi-access list by selecting during program playback mode or multi-access playback mode from one or a plurality of program lists or multi-access lists. It is also useful for list names be added to each of the program lists or multi-access lists when carrying out selection from a plurality of lists. The required lists can then be selected by looking at the list names during program playback mode or multi-access playback mode.

Figure 11:
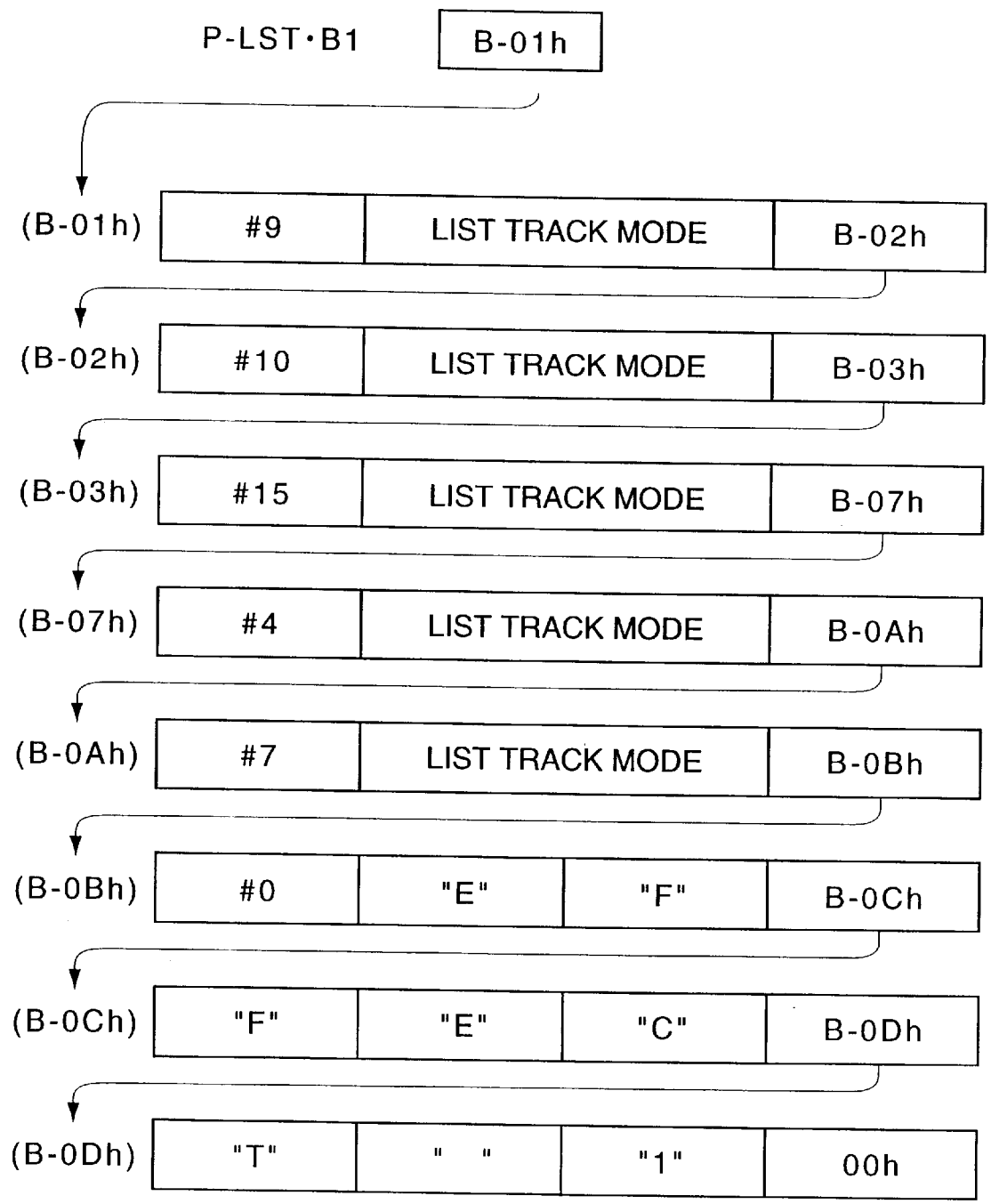
FIG. 11 is a schematic view illustrating a second embodiment of the management region U-TOC sector 6 to which the present invention is applied.

It is also possible to add list names to each of the program lists and multi-access lists with the management conditions as shown, for example, in FIG. 11.

Figure 9:
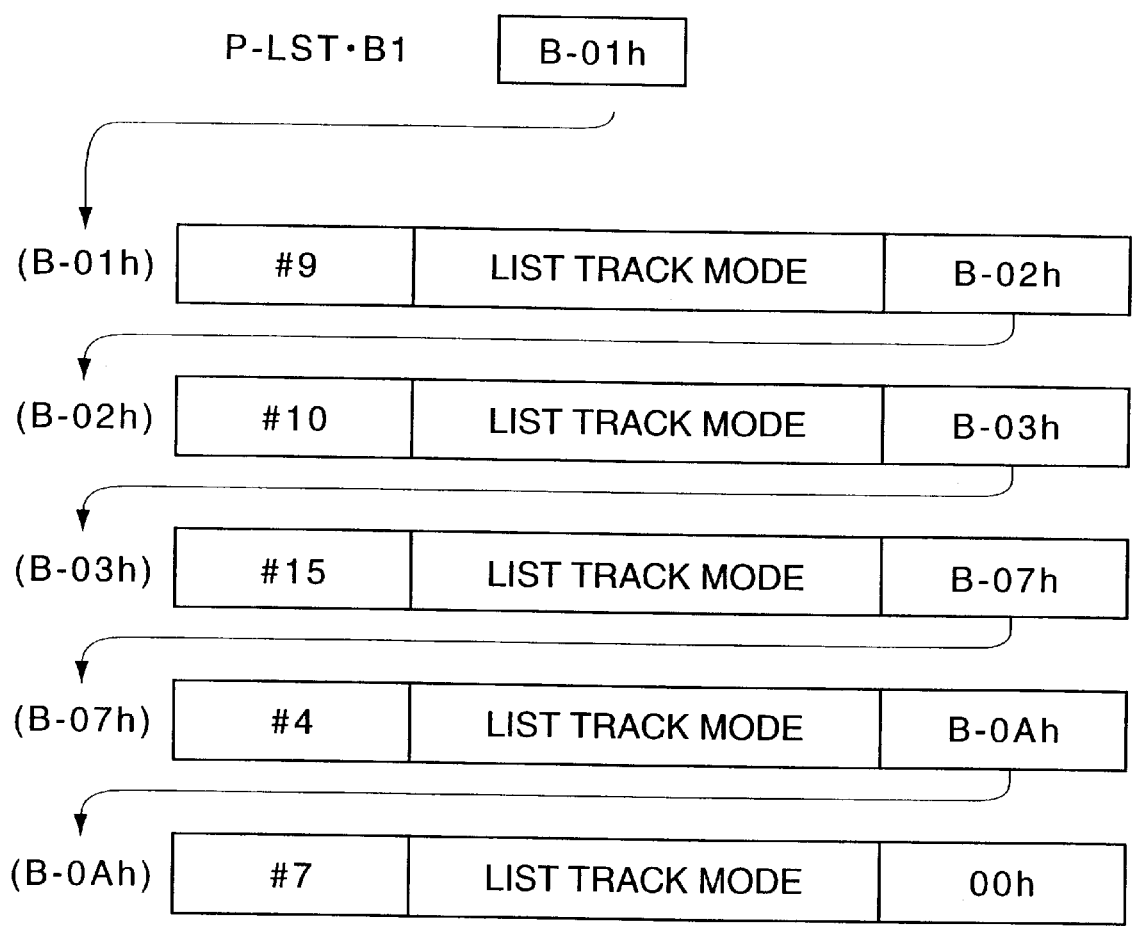
FIG. 9 is a schematic view illustrating second slot linking conditions for the management region U-TOC sector 6 of the recording medium to which the present invention is applied.

FIG. 11 shows the case of the example for the management conditions for the multi-access list of FIG. 9 with list names added. Here, linking is performed from the list pointer P-LST·B(1) to slot (B-01h)-(B-02h)-(B-03h)-(B-07h)-(B-0Ah) with the programs #9, #10, #15, #4 and #7 being recorded as the first to fifth access programs but linking does not end at slot (B-0Ah) where the fifth access program is recorded. Rather, for example, slot (B-0Bh) is linked to and a value corresponding to, for example, [#0] is recorded as a program number at slot (B-0Bh). Here, [#0] is a numerical value that has no credence as a program number and is set to be, for example, an identifier indicating that text data (character information) is recorded thereafter.

Just the necessary number of slots for the number of characters taken as the inputted list names are linked to from the slot (B-0Bh) with character data being recorded at each byte position other than those for link information. For example, when the user inputs the title [EFFECT 1] as the list title, the two slots of, for example, slot (B-0Ch) and (B-0Dh) are linked to from the slot (B-0Bh) and the data [E], [F], [F], [E], [C], [T], [ ] [1] is recorded as shown in FIG. 11 at prescribed byte positions from slot (B-0Bh) to slot (B-0Dh).

The link information at slot (B-0Dh) is then taken to be [00h] and the linking is complete.

Titles can therefore be given to each of the lists at the U-TOC sector 6 such as the program lists and multi-access lists by adopting this kind of management method.

6. Operation of Program Playback Mode

In the program playback mode that is one playback mode for the recording/playback device of this example, the system controller 11 reads information for the U-TOC sector 6 and executes operation control using this information so that at least one program list therefore has to be recorded at the A management region of the U-TOC sector 6.

This program list is set up by the user but this setting operation is carried out by the program setting mode that is one of the edit modes.

An example of the processing for the system controller 11 when the program setting mode is adopted by user operations will now be described using FIG. 12.

First, when program setting mode is entered, the system controller 11 sets the variable n=1 in step S101. Displaying necessary for the program setting operations is then executed in step S102 at the display part 20 and a request is made to the user that the program number is inputted. User operations are then monitored in the loop of step S103 and step S104.

In response to this, the user inputs the program number for the first program. Upon this program number input, F105 is proceeded to from step S103 and the inputted program number is taken in as the program number for an nth program. As the variable n=1, the program number if first taken in as being for the first program.

A program mode setting request for the first program is then sent to the user in step S106. A setting menu screen of, for example, gain, fade-in, fade-out and equalization etc. is displayed on the display part 20 with an initial value being displayed for each of the parameters within this screen. The values can then be changed for each of the parameters such as gain etc. in response to user operations.

An operating method can be considered as a program mode input method where the user performs enter operations with initial values that may not be particularly necessary displayed on the screen or if operations at the time of playback are required, enter operations can be carried out from when the necessary parameter settings have been carried out.

If program mode information has been carried out by user operations, the process for the system controller 11 proceeds from step S107 to F108 and the inputted program mode information is taken in as the program mode for the nth program. Then, in step S109, the variable n is incremented and step S102 is returned to. A program number input request is then carried out and the operation monitoring loop of step S103 and F104 is entered.

The user then inputs the program number of the second program to be played back. As the variable at this time is n=2, the program number inputted by the user is taken in as the program number for the second program in step S105. In steps S106, S107 and S108, the input request for the program mode for the second program and the inputted program mode information are taken in as program mode for the second program, the variable n is incremented in step S109 and step S102 is returned to. The same process is then carried out thereafter in order to set up the third program and fourth program, etc.

When the user has inputted all of the program numbers in the desired order, the process for the system controller 11 proceeds from step S104 to step S110. Data is then generated for a program list using the data captured up to this point for from the first program program number and program mode to the nth program program number and program mode.

Figure 8:
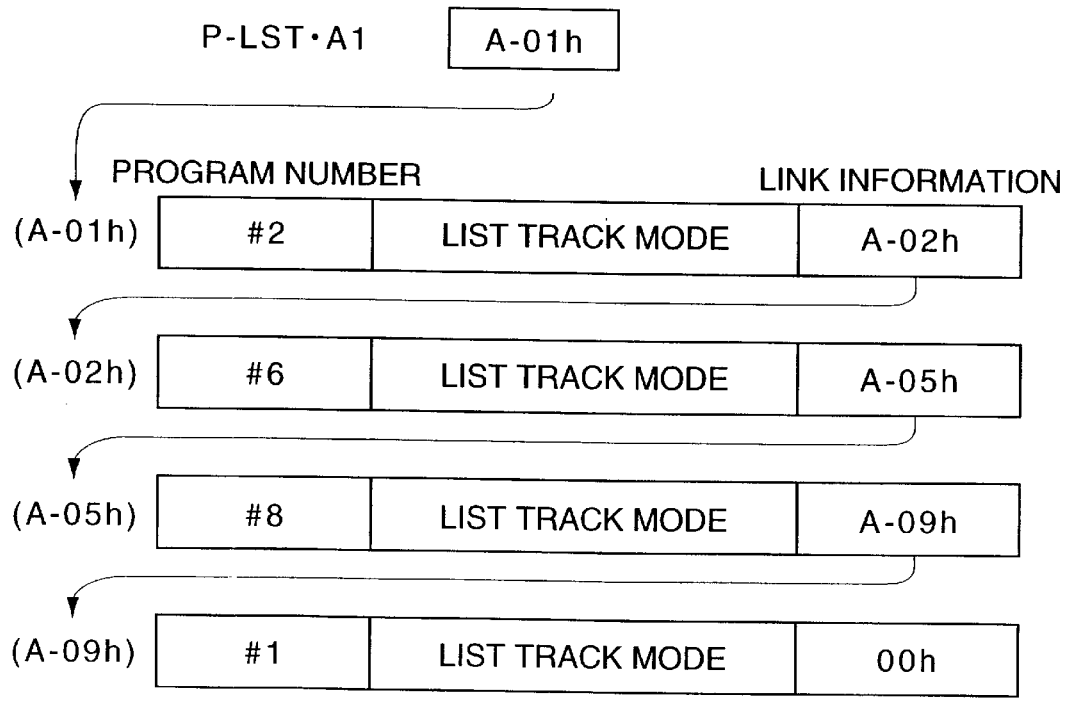
FIG. 8 is a schematic view illustrating first slot linking conditions for the management region U-TOC sector 6 of the recording medium to which the present invention is applied.

Then, in step S111, updating of the data for the U-TOC sector 6 is carried out so that the program list is put from a list pointer P-LST·A(x) to an (x)th program list, i.e. data is written to the list pointer P-LST·A(x) and the necessary number of slots as a program by carrying out the management described, for example, in FIG. 8.

This U-TOC updating process is first carried out for the U-TOC data held in the buffer memory 13, after which the U-TOC data held in the buffer memory 13 is written to the U-TOC region of the disc 1.

Once the program list has been written to the U-TOC sector 6 using the above kind of processing, program playback based on the program list can be executed just by selecting this list so that it is not necessary for the user to record the same program every time.

When the list name can be inputted as shown in FIG. 11, a request for the user to input a name can be put to the user at, for example, the stage directly before step S110 and the inputted character information can be captured.

When program setting is carried out using this kind of processing, program playback mode operation using selection of this program list is possible for discs where one or a plurality of program lists are recorded at the U-TOC sector 6.

The process for the system controller 11 when program playback mode is adopted is described with reference to FIG. 13.

When the disc 1 is installed, the system controller 11 first reads the TOC data from this disc 1 and this is captured by the buffer memory 13 so as to bring about a situation where recording and playing back to and from the disc 1 is possible.

Figure 13:
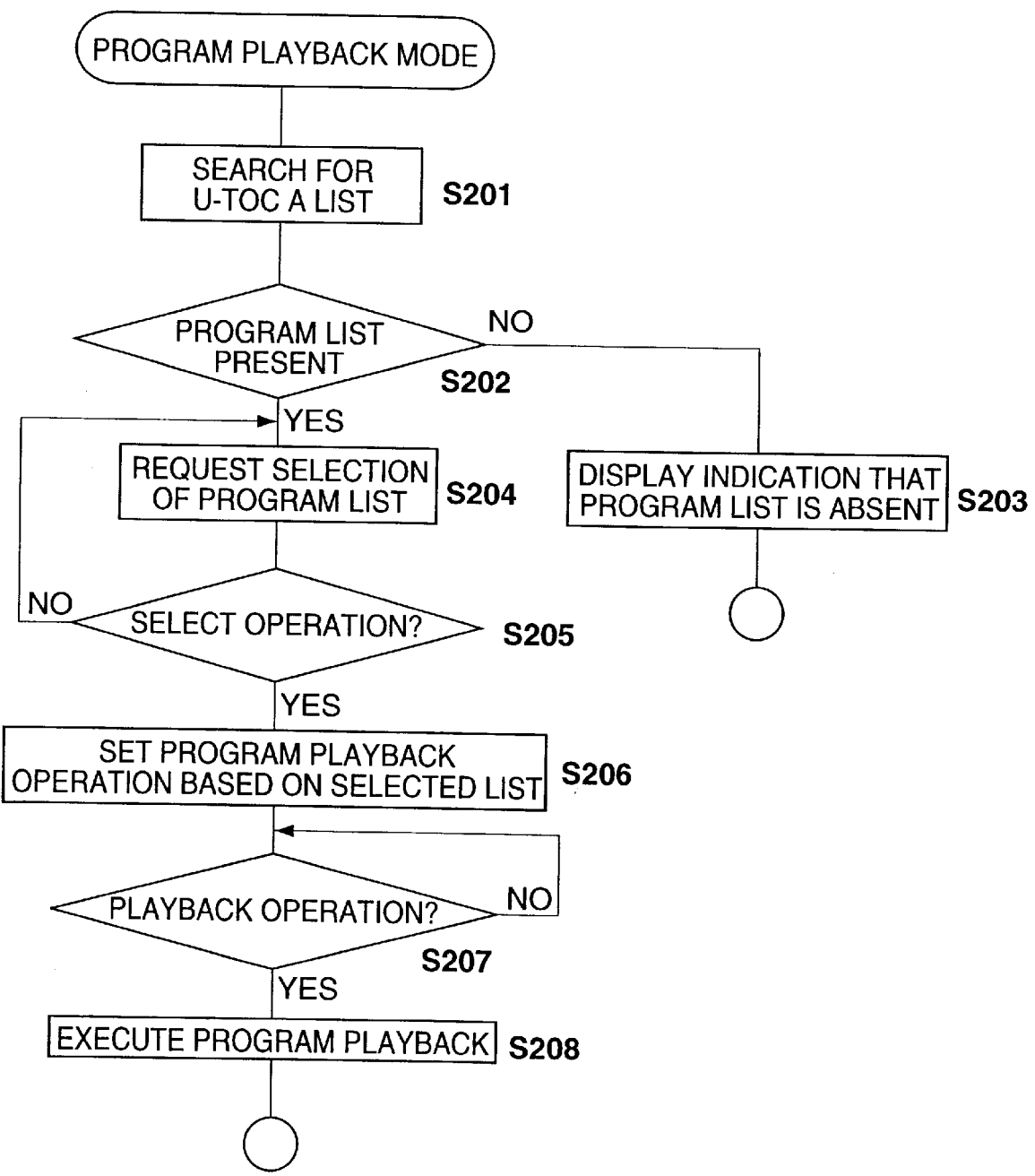
FIG. 13 is a flowchart showing the order of performing program playback.

When the user carries out an operation to adopt the program playback mode, the system controller 11 starts the process of FIG. 13. First, in step S201, the A management region occurring in the U-TOC sector 6 of the TOC information stored in the buffer memory 13 is searched for in step S201.

Here, if all of the list pointers P-LST·A1 to P-LST·A128 are [00h], then there is not even one program list recorded at the A management region.

In this case, it is determined in step S202 that there is no program list for executing program playback in step S202. Step S203 is then proceeded to and it is indicated to the user that a program list does not exist.

Here, a program playback operation will not be executed as is, and it is therefore necessary for the user to record at least one program list using the program setting mode operation mentioned above in FIG. 12.

When there is at least one program list recorded at the A management region, step S204 is proceeded to from step S202 and a request is made to the user to select the program list for which program playback is to be executed.

In order to make this selection, methods where the contents of each of the program lists can be displayed in order in response to operations of the jog dial 27 or the numeric keys 39, or where lists are displayed in units of prescribed numbers of program lists can be considered. In order to display the contents of the program lists, the order in which the program numbers are played back in a program list can be displayed (for example, displaying [2-6-8-1] in the case of the program list for the example of FIG. 8) or the list names can be displayed in the case where list names are added as in the example of FIG. 11.

If the user executes the program list selection operation, step S206 is proceeded to from step S205 and processing necessary to capture program list data going to the internal registers as the settings for executing playback operation in the program order of the program list selected is carried out.

If there is just one program list recorded in the A management region, the processes of step S204 and step S205 can be omitted and the process of step S206 can be carried out.

If the user has carried out the playback operation, step S208 is proceeded to from step S207 and the playback process is executed based on this program list.

For example, when the program list of the example of FIG. 8 is selected and the playback operation is carried out, playback is first executed for the program #2 present as the first program with respect to the playback processing system of the servo circuit 9 and optical head 3, together with the encoder/decoder 8 etc. At this time, control of the digital signal processor 21 etc. is carried out in response to the list program mode recorded at the slot (A-01h) and, for example, volume level deciding, special effects processing such as fade-in, etc., and necessary audio processing such as equalization etc. is executed.

If the playback of program #2 finishes, playback of the program #6 present as the following second program is carried out. Control is also carried out at this time with respect to the digital signal processor 21 in response to the list program mode recorded at the slot (A-02h).

After this, playback of program #8 that is the third program and program #1 that is the fourth program is carried out and the program playback operation ends.

Figure 12:
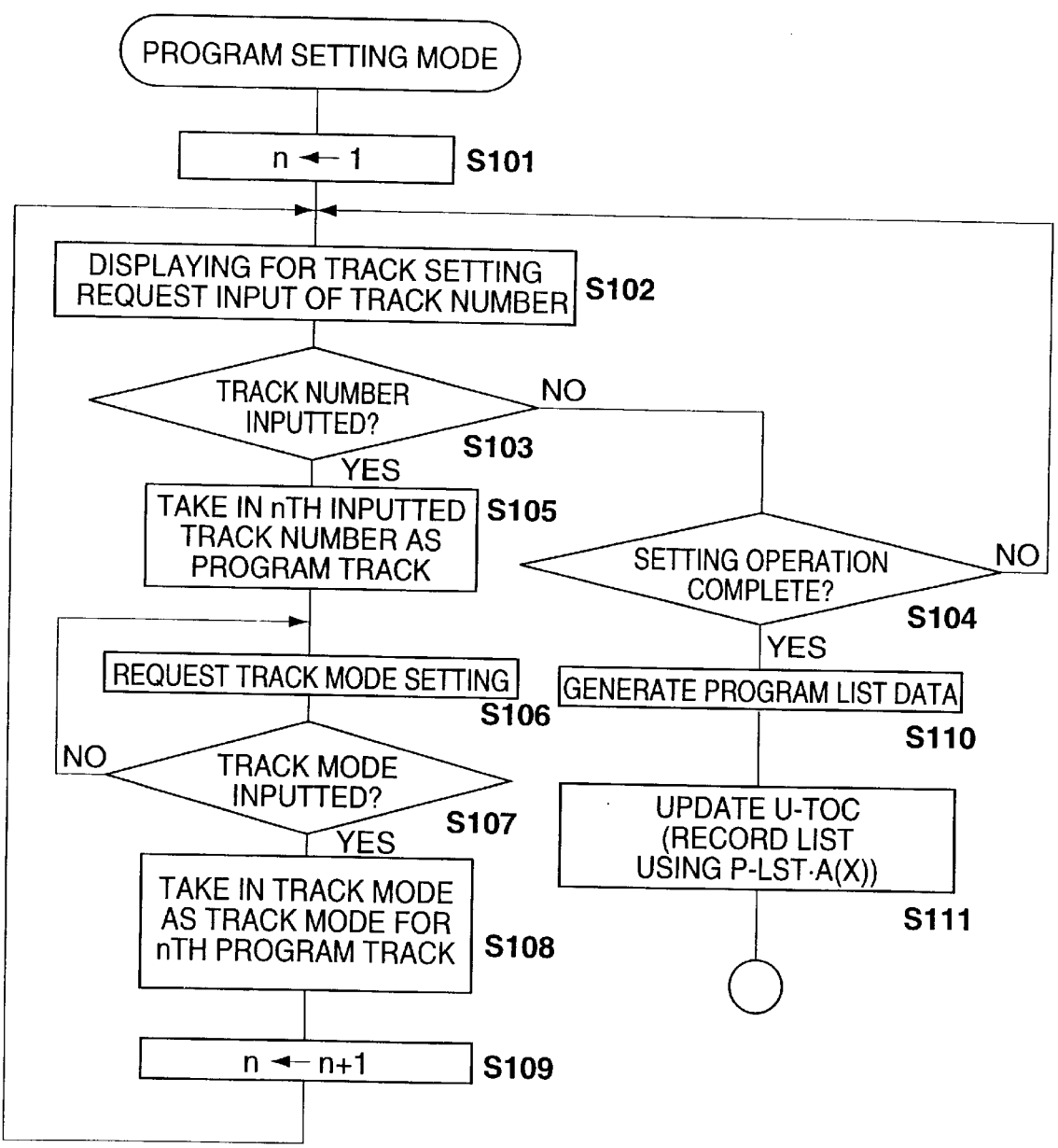
FIG. 12 is a flowchart showing the order of performing program setting.

In this example where a program playback operation is carried out, if the program order for program playback is set up once by the user, this program list is automatically recorded in the U-TOC sector 6 using the aforementioned process of FIG. 12. Therefore, when, at a later time (when, for example, the disc is replaced and then installed once again, or after the power supply has been temporarily turned off), the user wishes to execute program playback once again in the previously set order, this can be achieved simply by selecting the program list, and the operation of setting the program every time becomes unnecessary. Further, in this example, as a maximum of 128 program lists can be recorded, other program lists can be made while saving program lists that have been set once so that it is possible to set many program lists. These conditions have made it easy to use the program lists properly to playback programs.

Further, playback control data can be set every program as program list program modes within program lists. Because of this, it is possible to play back, for example, a certain program within a program list at a small volume, or when there is a desire relating to control of playback conditions etc. such as starting playback of a certain program using a fade-in setting can be made accordingly so that processing can be executed automatically in response to these desires at the time of playback.

The above description was for magneto-optical discs capable of being recorded with data but can also be put forward for minidisc systems with playback-dedicated discs recorded with audio data etc. using pre-embossed pits. If a region such as the U-TOC sector 6 is also provided as one of the P-TOC sectors for this kind of playback-dedicated disc, the disc manufacturers can pre-install a variety of program lists of which the users can then select one for program playback.

7. Operation of Multi-Access Playback Mode

Next, a description is given of the operation of the program playback mode and the multi-access playback mode that is one of the playback modes of the recording/playback device of this example. In this multi-access playback mode the system controller 11 also reads information for the U-TOC sector 6 and uses this information to execute control of the operations. In order to achieve this, at least one multi-access list has to be recorded in the B management region of the U-TOC sector 6.

This user access list is set by the user and is carried out in a multi-access setting mode that is one of the edit modes.

Figure 14:
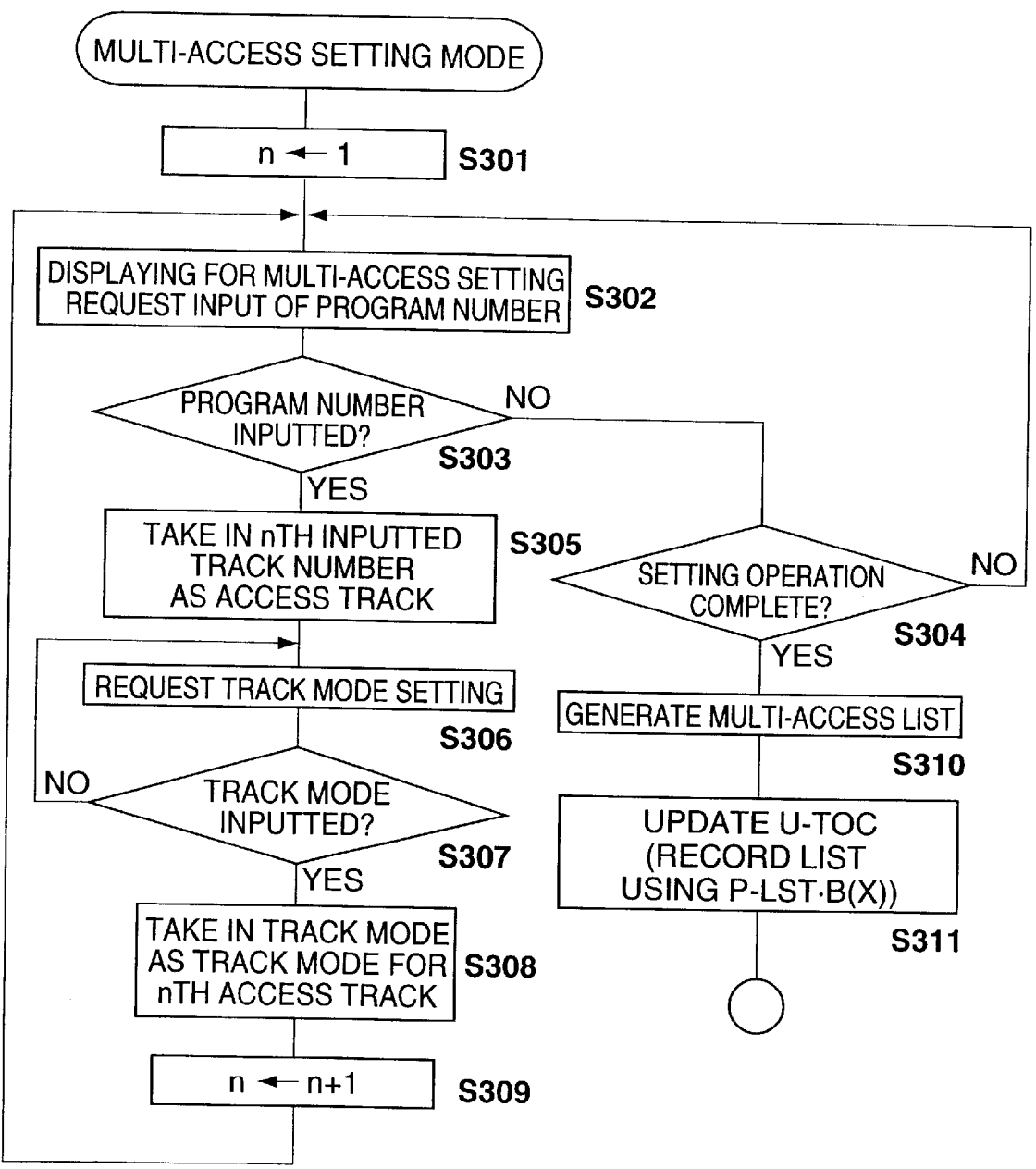
FIG. 14 is a flowchart showing the order of carrying out multi-access setting.

First, an example of the processing for the system controller 11 when multi-access setting mode is set by the user is described using FIG. 14.

When multi-access setting mode is adopted, the system controller 11 first puts the variable n=1 in step S301. The displaying necessary for executing the multi-access setting operation is then carried out at the display part 20 in step S302 and a request to input the program number is made to the user. User operations are then monitored in the loop of step S303 and step S304.

The user then inputs the program number of the program to be accessed in response to this. When a program number is inputted, step S305 is proceeded to from step S303 and the inputted program number is taken in as the program number of the nth access program. The program number of the first access program is then taken in because the variable n=1.

A program mode setting request for the first access program is then sent to the user in step S306. A setting menu screen of, for example, gain, fade-in, fade-out and equalization etc. is displayed on the display part 20 with an initial value being displayed for each of the parameters within this screen. The values can then be changed for each of the parameters such as gain etc. in response to user operations. The same method of operation as the case for the above program setting can be considered for this program mode input method.

If program mode information has been inputted by user operations, the process for the system controller 11 proceeds from step S307 to S308 and the inputted program mode information is taken in as the program mode for the nth program.

Then, in step S309, the variable n is incremented and step S302 is returned to. A program number input request is then carried out and the operation monitoring loop of step S303 and S304 is entered.

The user then inputs the program number of a further program to be played back in multi-access mode. As the variable at this time is n=2, the program number inputted by the user is taken in as the program number for the second access program in step S305. In step S306, S307 and S308, the input request for the program mode for the second access program and the inputted program mode information are taken in as the program mode for the second access program, the variable n is incremented in step S309 and step S302 is returned to. The same process is then carried out thereafter in order to set up the third access program and fourth access program, etc.

When the user has inputted all of the program numbers it is wished to playback in multi-access mode and the setting operation is complete, the process for the system controller 11 proceeds from step S304 to step S310. Data is then generated for a multi-access list using the data captured up to this point for from the first access program number and program mode to the nth access program number and program mode.

Then, in step S311, updating of the data for the U-TOC sector 6 is carried out so that the multi-access list is put from a list pointer P-LST·B(x) to an (x)th multi-access list, i.e. data is written to the list pointer P-LST·B(x) and the necessary number of slots as a multi-access list by carrying out the management described, for example, in FIG. 9.

This U-TOC updating process is first carried out for the U-TOC data held in the buffer memory 13, after which the U-TOC data held in the buffer memory 13 is written to the U-TOC region of the disc 1.

Once the multi-access list has been written to the U-TOC sector 6 using the above kind of processing, multi-access playback based on the multi-access list can be executed just by selecting this list so that it is not necessary for the user to record the same multi-accesses every time.

In the case for multi-access setting also, when the list name can be inputted as shown in FIG. 11, a request for the user to input a name can be put to the user at, for example, the stage directly before step S310 and the inputted character information can be captured.

When multi-access setting is carried out using this kind of processing, multi-access playback mode operation using selection of this multi-access list is possible for discs where one or more multi-access lists are recorded at the U-TOC sector 6.

The process for the system controller 11 when multi-access playback mode is adopted is described with reference to FIG. 15.

Figure 15:
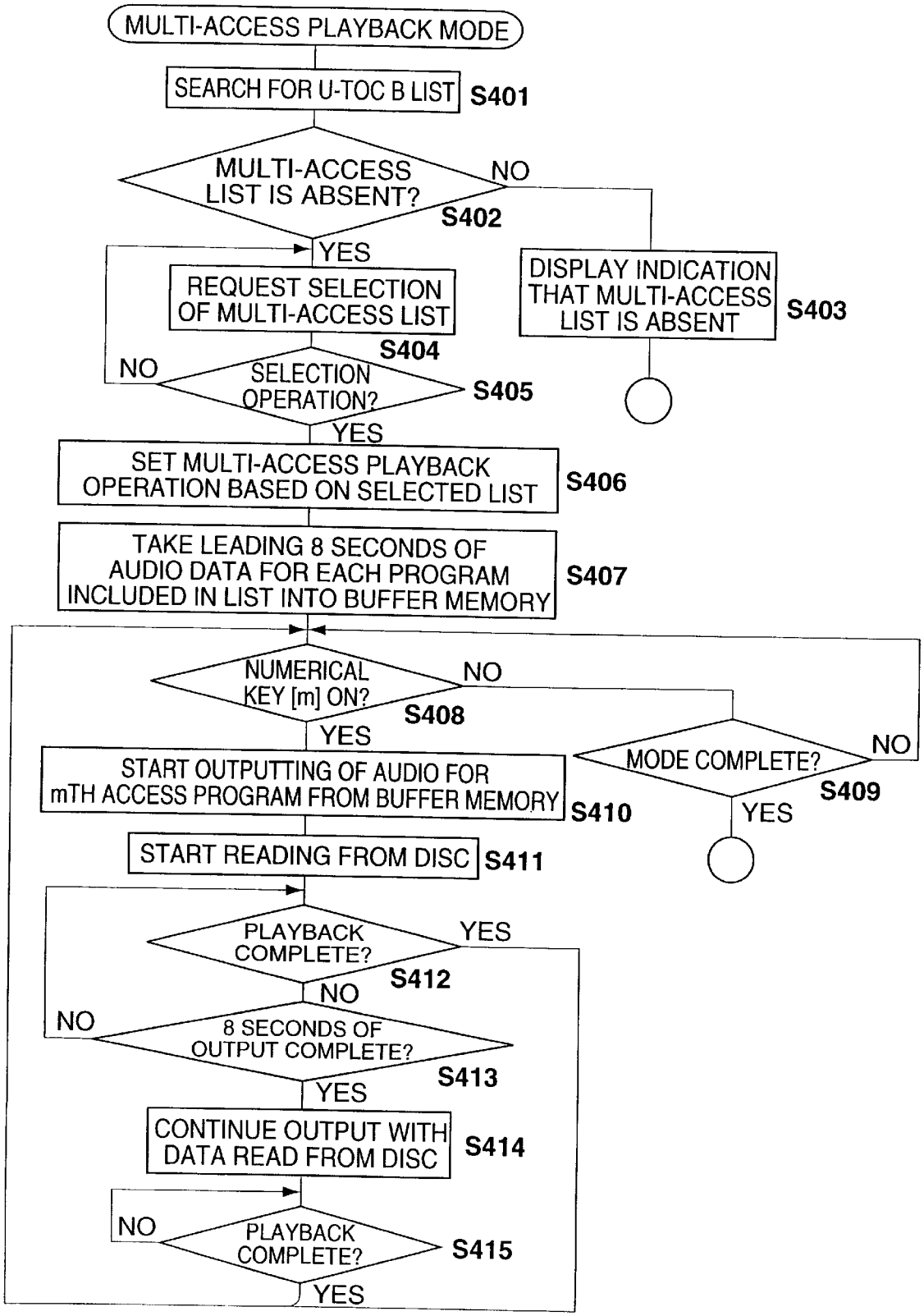
FIG. 15 is a flowchart showing the order of carrying out multi-access playback.

After the disc 1 is installed, and the system controller 11 reads TOC data from the disc 1 to be stored in the buffer memory 13 so that recording/playback operations can be carried out with respect to this disc 1, when the user carries out an operation to select the multi-access playback mode the system controller 11 starts the process of FIG. 15.

First, in step S401, the B management region occurring in the U-TOC sector 6 is searched for from the TOC information stored in the buffer memory 13.

Here, if all of the list pointers P-LST·B1 to P-LST·B128 are [00h], then there is not even one multi-access list recorded at the B management region.

In this case, it is determined in step S402 that there is no multi-access list for executing multi-access playback in step S402. Step S403 is then proceeded to and it is indicated to the user that a multi-access list does not exist.

Here, a multi-access playback operation will not be executed as is, and it is therefore necessary for the user to record at least one multi-access list using the multi-access setting mode operation mentioned above in FIG. 14.

When there is at least one multi-access list recorded at the B management region, step S404 is proceeded to from step S402 and a request is made to the user to select the multi-access list for which multi-access playback is to be executed.

In order to make this selection, as in the above case for program list selection, methods where the contents of each of the multi-access lists can be displayed in order in response to operations of the jog dial 27 or the numeric keys 39, or where lists are displayed in units of prescribed numbers of program lists can be considered. In order to display the contents of the multi-access lists, the order in which the program numbers are played back in a multi-access list can be displayed (for example, displaying [9, 10, 15, 4, 7] in the case of the multi-access list for the example of FIG. 9) or the list names can be displayed in the case where list names are added as in the example of FIG. 11.

If the user does execute a multi-access list selection operation, step S406 is proceeded to from step S405. If just one multi-access list is recorded at the A management region, the process of steps S404 and S405 can be omitted and the process of step S406 can be carried out.

In step S406, processing for capturing data for the multi-access list to the internal register for setting in order to execute playback in the order of the programs of the selected multi-access list and allotting numeric keys to each of the programs recorded in the list is carried out. In, for example, the example of FIG. 9, processing is carried out to allot the key [1] of the numeric keys 39 to program #9 that is the first access program, key [2] of the numeric keys 39 to program #10 that is the second access program, key [3] of the numeric keys 39 to program #15 that is the third access program, key [4] of the numeric keys 39 to program #4 that is the fourth access program and key [5] of the numeric keys 39 to program #7 that is the fifth access program.

Next, in step S407, the leading eight seconds of audio data is read from the disc 1 for all of the programs to be played-back included in the multi-access list and taken-in by the multi-access area 13B of the buffer memory 13 shown in FIG. 3. Namely, in the example of FIG. 9, the leading eight seconds of audio data is stored for the programs #9, #10, #15, #4 and #7 of FIG. 3B.

Preparations for multi-access playback are then complete when the process up to this point is complete and the monitoring loop for the user operation is entered in step S408 and S409.

If the user operates a key [m] that is one of the numeric keys 39, step S410 is proceeded to from step S408. Here, key [m] is any of the keys [1] to [5] if, for example, up to the fifth access programs are taken to be played back in the multi-access list.

If the key [m] is pressed, the system controller 11 immediately plays back the mth access program corresponding to this [m] key. In order to do this, the audio data at the head of the mth access program is read from the multi-access area 13b of the buffer memory 13 and outputted as audio, i.e. eight seconds of audio is outputted the instant the key [m] is pressed using the data stored in the multi-access area 13B. Together with this, in step S411, the playback operation for the disc 1 starts up, other essential processing in addition to this access is started and reading of data for the mth access program begins. In this case, for example, it is preferable for the reading of data to start from just before the data portion comprising the leading eight seconds. Audio data read-out from the disc 1 is then stored in the buffer area 13A of the buffer memory 13.

If the program taken as the mth program is less than eight seconds long, playback finishes just by reading out from the multi-access area 13B. In this case, the playback process is complete at step S412 and the loop of step S408 and step S409 for monitoring user operations is returned to.

If the program taken as the mth program is a program of eight seconds or more, step S414 is proceeded to from step S413 at the time when reading of eight seconds of audio data from the multi-access area 13B finishes. The operation of reading from the buffer memory 13 is then changed over to the operation of reading from the buffer area 13A, i.e. audio data continuing on from the eight seconds read out from the disc 1 and stored is read out. Reading from the buffer area 13A is then continued until playback of the program thereafter is complete, i.e. the usual playback operation is carried out.

Sound processing, etc. is then added to the audio playback outputted in step S410 onwards at the digital signal processor 21, with control in response to the list program mode recorded corresponding to the mth access program being carried out in the same way as the case for the program playback.

When playback finishes, the loop for monitoring the user operation in step S408 and step S409 is returned to from step S415.

The following operation is executed using this process when, for example, the kind of multi-access list of the example of FIG. 9 is selected.

For example, if the key [1] is pressed, the outputting of audio data for the program #9 from the multi-access area 13B starts instantaneously. Audio outputting is then carried out using the audio data for program #9 read out from the disc 1 from eight seconds onwards. As a result, from the point of view of the user, playback of the program #9 starts the instant the key is pressed and once playback exceeds eight seconds, playback output continues in the same way as for usual playback.

Similarly, if the key [2] is pressed, output of audio data for the program #10 from the multi-access area 13B starts instantaneously with audio outputting then continuing using the audio data for the program #10 read out from the disc 1 from eight second onwards.

The required audio outputting is then outputted instantaneously by operating an arbitrary key of the keys [1] to [5] at an arbitrary time.

This is most suited to, for example, plays and broadcasts where sound effects etc. are outputted at an exact timing.

In this example where multi-access playback is executed, if the user sets the program to undergo multi-access playback once, this multi-access list is recorded on the U-TOC sector 6 automatically in the process of FIG. 14. If, at a later time, it is wished once more to execute the multi-access playback that has been set once previously, this can be carried out simply by selecting a multi-access list without it being necessary to perform multi-access list setting each time. Further, as, in this example, a maximum of 128 multi-access lists can be recorded, other lists can be made with multi-access lists that have been set once being retained so that many multi-access lists can be set. And such an operation can be also easily carried out as to execute the multi-access playback by using the multi-access list properly depending on the situation.

Further, playback control data can be set every program as list program modes within multi-access lists. Because of this, it is possible to play back, for example, a certain program within a multi-access list at a small volume, or when there is a desire relating to control of playback conditions etc. such as starting playback of a certain program using a fade-in, setting can be made accordingly so that processing can be executed automatically in response to these desires at the time of playback.

This is also most suited to playback-dedicated discs as in the case for the aforementioned program lists and if a region of basically the same format as the U-TOC sector 6 is prepared within the P-TOC sector and if a variety of multi-access lists are set-up by the disc manufacturers, the user can carry out multi-access playback by selecting one of the multi-access playback lists.

In this embodiment, the playing back of each program for multi-access playback is carried out by utilizing numeric keys 39 but dedicated operation keys for multi-access playback can also be provided.

In the above, an example has been given of the present invention utilized in minidiscs and minidisc recording/playback systems but the present invention can also be applied to the recording mediums and playback devices of other systems such as CD (Compact Disc) systems or DVD (Digital Versatile Disc/Digital Video Disc) systems.

In the present invention described above a plurality of specific playback mode management regions are formed within one management information unit within a management region occurring at a recording medium. One or more items of list information having information for each program to be played back relating to operations in a certain specific playback mode and operation control information for the time of playback regarding each program are then recorded at each specific playback mode management region. Then, when a specific playback mode operation is carried out managed at a in certain specific playback mode management region at the playback device, this specific playback mode playback operation is then carried out based on certain information of the one or plurality of items of list information recorded at the specific playback mode management region.

Namely, in the present invention, by recording operation control information relating to specific playback modes such as program playback and multi-access playback on a recording medium as list information, conditions set once with regards to these specific playback modes and fine control operations during these playback operations can be stored on the disc as management information. It is therefore no longer necessary for a user to carry out operation setting operations in order to execute specific playback mode operations and the load put on the user is therefore dramatically alleviated.

Further, a large number of lists can be stored in order to record a plurality of lists for certain specific modes and specific playback mode operations can therefore be executed selectively in response to circumstances.

The setting of more detailed playback operation conditions can therefore be carried out because operation control information at the time of playback is also recorded for each of the programs. Settings for a variety of playback conditions and automatic control can be carried out in accordance with the circumstances at the time of playback because the playback operating conditions at the time of actual playback can be automatically controlled. The operativity can therefore be raised, the conditions of use for the recording medium can be more varied and be used more effectively and the playing back of sound effects for plays and broadcasts, etc. can be carried out in a more effective manner.

What is claimed is:

1. A recording apparatus for recording a program to a recording medium having a program region and a management region, the management region including a first and a second management information recorded on the management region of the recording medium, and where the first management information manages recording positions of the program on the program area and the second management information manages a playback order of the program, the recording apparatus comprising:

operating means for defining a playback order by a user operation;

memory means for storing the playback order; and revising means for revising the second management information of the recording medium in accordance with the playback order stored in memory means.

2. The apparatus of claim 1, wherein said second management information of said management region comprises:

a program number, a program mode for managing playback parameters, a plurality of slots recorded for corresponding slot addresses when a continuing program exists and a corresponding designation pointer designating a slot address corresponding to a leading program.

3. The apparatus of claim 2, wherein said playback parameters managed by said program mode include sound field settings.

4. A recording/playback device, listing a playback order of programs of a recording medium consisting of a program region recorded with said programs and a management region recorded with first management information for at least managing recording positions of programs recorded at said program region and second management information stipulating playback operations during playback of programs recorded at said program region, comprising:

first operation means for listing programs desired by a user;

first storage means for storing an order of programs listed by said first operation means;

updating means for updating said second management information of said management region based on a listed program order stored in said first storage means;

second storage means for referring to said second management information of said management region and successively recording for a prescribed period of time leading portions of listed programs;

second operation means for carrying out playback designation of listed programs; and output means for playing back and outputting leading portions of programs corresponding to operations of said second operation means from said second storage means in response to operations of said second operation means.

5. A recording/playback device according to claim 4, wherein said second management information of said management region comprises: a program number, a program mode for managing playback parameters, a plurality of slots recorded for corresponding slot addresses when a continuing program exists and a corresponding designation pointer designating a slot address corresponding to a leading program.

6. A recording/playback device according to claim 4, further comprising comparing means for comparing a recording time of programs called by said second operation means and a length of a beginning part of a program stored in said second storage means, wherein playback from said recording medium is continued in such a manner as to continue on from the beginning part of the program stored in said second storage means when recording results of said comparing means are such that the recording time of the program called up by said second operation means is longer than the length of the beginning part of the program stored in said second storage means.

7. A recording/playback device according to claim 4, wherein said second management information of said management region comprises: a program number, a program mode for managing playback parameters, a plurality of slots recorded for corresponding slot addresses when a continuing program exists and a corresponding designation pointer designating a slot address corresponding to a leading program, with titles corresponding to said series of programs being further recorded using said slots.

8. A recording medium having a program region and a management region, the recording medium comprising:

a first management information, recorded in the management area, that manages a recording position of a program on the program region; and a second management information, recorded on the management area, that manages a playback order of the program on the program region of the recording medium.

9. A recording medium according to claim 8, wherein said second management information of said management region comprises: a program number, a program mode for managing playback parameters, a plurality of slots recorded for corresponding slot addresses when a continuing program exists and a corresponding designation pointer designating a slot address corresponding to a leading program.

10. A recording medium according to claim 9, wherein said playback parameters managed by said program mode are sound field settings such as volume, fade-in, fade-out and equalization.

* * * * *